(12) United States Patent
Arnold et al.

(10) Patent No.: US 8,264,695 B2
(45) Date of Patent: Sep. 11, 2012

(54) METHOD OF MEASURING A DEVIATION OF AN OPTICAL SURFACE FROM A TARGET SHAPE

(75) Inventors: Ralf Arnold, Aalen (DE); Stefan Schulte, Aalen-Waldhausen (DE); Bernd Doerband, Aalen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 0 days.

(21) Appl. No.: 13/030,748

(22) Filed: Feb. 18, 2011

(65) Prior Publication Data

US 2011/0141484 A1 Jun. 16, 2011

Related U.S. Application Data

(60) Division of application No. 12/684,600, filed on Jan. 8, 2010, now Pat. No. 7,936,521, which is a continuation of application No. PCT/EP2008/005548, filed on Jul. 8, 2008.

(30) Foreign Application Priority Data

Jul. 9, 2007 (WO) .................. PCT/EP2007/006069

(51) Int. Cl.
*G01B 11/02* (2006.01)
(52) U.S. Cl. .......................... 356/512; 356/489; 356/521
(58) Field of Classification Search .................. 356/601, 356/512, 511, 515, 124–127, 489, 495, 521
See application file for complete search history.

(56) References Cited

U.S. PATENT DOCUMENTS

| 4,936,665 A | 6/1990 | Whitney |
| 5,155,553 A | 10/1992 | Chen |
| 5,530,547 A | 6/1996 | Arnold |

(Continued)

FOREIGN PATENT DOCUMENTS

DE 32 40 360 A1 5/1984

(Continued)

OTHER PUBLICATIONS

Peng Su et. al., "Dual beam generation at a ray caustic by a multiplexing computer-generated hologram", Jun. 27, 2005, Optics Express vol. 13, No. 13,, pp. 4843 et seq.

(Continued)

*Primary Examiner* — Tarifur Chowdhury
*Assistant Examiner* — Michael P Lapage
(74) *Attorney, Agent, or Firm* — Sughrue Mion, PLLC

(57) ABSTRACT

A method of aligning at least two wave shaping elements, a method of measuring a deviation of an optical surface from a target shape and a measuring apparatus for interferometrically measuring a deviation of an optical surface from a target shape. The method of aligning at least two wave shaping elements, each of which wave shaping elements has a diffractive measurement structure for adapting part of a wave front of incoming light to a respective portion of the target shape, includes: providing a first one of the wave shaping elements with a diffractive alignment structure, arranging the wave shaping elements relative to each other such that each of the diffractive measurement structures is traversed by a separate subset of rays of the incoming light during operation of the measuring apparatus, and aligning the first wave shaping element and a second one of the wave shaping elements relative to each other by evaluating alignment light having consecutively interacted with the diffractive alignment structure and with the second wave shaping element.

17 Claims, 19 Drawing Sheets

U.S. PATENT DOCUMENTS

| | | | |
|---|---|---|---|
| 6,879,402 B2 | 4/2005 | Kuechel | |
| 6,908,200 B1 * | 6/2005 | Yoshikawa et al. | 359/858 |
| 6,940,607 B2 | 9/2005 | Freimann et al. | |
| 6,972,849 B2 | 12/2005 | Kuechel | |
| 7,019,842 B2 | 3/2006 | Holzapfel et al. | |
| 7,023,562 B2 | 4/2006 | De Lega | |
| 7,024,066 B1 | 4/2006 | Malendevich et al. | |
| 7,025,468 B2 * | 4/2006 | Nishioka et al. | 359/846 |
| 7,050,175 B1 | 5/2006 | Freimann et al. | |
| 7,061,626 B1 | 6/2006 | Schillke et al. | |
| 7,118,449 B1 | 10/2006 | Dinger et al. | |
| 7,123,365 B1 | 10/2006 | Schulte | |
| 7,177,031 B2 | 2/2007 | Kessler et al. | |
| 7,481,543 B1 | 1/2009 | Dinger et al. | |
| 7,605,926 B1 | 10/2009 | Hetzler et al. | |
| 7,848,031 B2 * | 12/2010 | Hetzler et al. | 359/708 |
| 2001/0028462 A1 | 10/2001 | Ichihara et al. | |
| 2003/0184762 A1 | 10/2003 | Kim et al. | |
| 2004/0174624 A1 | 9/2004 | Weiser et al. | |
| 2005/0157311 A1 | 7/2005 | Kuchel | |
| 2005/0225774 A1 | 10/2005 | Freimann et al. | |
| 2005/0275849 A1 | 12/2005 | Freimann et al. | |
| 2006/0274325 A1 | 12/2006 | Hetzler et al. | |
| 2007/0058269 A1 | 3/2007 | Mann et al. | |
| 2008/0043247 A1 | 2/2008 | Arnold et al. | |
| 2008/0068613 A1 | 3/2008 | Kuchel | |
| 2009/0128829 A1 * | 5/2009 | Schillke et al. | 356/521 |
| 2010/0177321 A1 | 7/2010 | Hetzler et al. | |

FOREIGN PATENT DOCUMENTS

| | | |
|---|---|---|
| DE | 198 20 785 A1 | 10/1999 |
| DE | 19822453 A1 | 12/1999 |
| DE | 10125785 A1 | 11/2002 |
| DE | 10 2005 013 903 A1 | 12/2005 |
| DE | 10 2005 036 166 A1 | 2/2007 |
| DE | 102006035022 A1 | 1/2008 |
| EP | 1 160 589 A1 | 12/2001 |
| EP | 1324006 B1 | 3/2006 |
| GB | 2152227 A | 7/1985 |
| JP | 1106784 A | 1/1999 |
| WO | 03001147 A1 | 1/2003 |
| WO | 03006920 A1 | 1/2003 |
| WO | 03044456 A1 | 5/2003 |
| WO | 03048715 A1 | 7/2003 |
| WO | 2004-046641 A1 | 6/2004 |
| WO | 2005 114 101 A1 | 12/2005 |
| WO | 2005/114101 A1 | 12/2005 |
| WO | 2006-077145 A2 | 7/2006 |
| WO | 2006077145 A3 | 7/2006 |
| WO | 2006091415 A2 | 8/2006 |
| WO | 2008/012091 A2 | 1/2008 |
| WO | 2008/110239 A1 | 9/2008 |
| WO | 2009/006914 A1 | 1/2009 |

OTHER PUBLICATIONS

S. Arnold, "CGH null correctors enable testing of asperic surfaces using standard interferometers", SPIE's OE magazine, Aug. 2002, p. 40.

G. Klose et. al., "High-resolution and high-precision pattern placement metrology for the 45 nm node and beyond", submission for the 24th European Mask and Lithography Conference held Jan. 21-24, 2008.

M. Beyerlein, N. Nindlein, and J. Schwider, "Dual-wave-front computer-generated holograms for quasi-absolute testing of aspherics", Appl. Opt. 41, pp. 2440-2447 (2002).

J. Asfour, A. Poleschuk, "Asphere testing with a Fizeau interferometer based on a combined computer-generated generated hologram", J. Opt. Soc. Am. A / vol. 23 Iss. 1 (2006).

E. J. Mitemeijer, Paolo Scardi, Diffraction Analysis of the Microstructure of Materials, Materials Science, Springer 2004, p. 9.

W. Vogel, J. Haase, R. Hosemann, "Linienprofilanayse von Roentgen-weitwinkelreflexen..." Z. Naturforsch. 29a, 1152-1158 (1974), pp. 1152-1158.

Daniel Malacara, Optical Shop Testing, 2d ed., Chapter 12, 1992, pp. 427-et seq.

A. F. Fercher, "Computer-generated Holograms for Testing Optical Elements...", Journal of Modern Optics,, vol. 23, No. 5, pp. 347-365 (1976).

G. Schlueter et. al., "Next generation mask metrology tool", Proceedings of SPIE vol. 4754 (2002), pp. 758 et seq.

Seitz, Guenter: "Hochaufgeloeste interferometrische Absolutmessung roationssymmetrischer Oberflaechen-Fehler", DGaO-Proceedings 2006.

Jensen, A.E.: "Absolute Calibration Method for Laser Twyman-Green Wave-Front Testing Interferometers", Journal Optical Society of America, 1973, vol. 663, p. 1313.

Elssner et al.: Absolute sphericity measurement, Applied Optics, 1989, vol. 28, No. 21, p. 4649-4661.

Creath et al.: "Absolute Measurement of Spherical Surfaces", SPIE vol. 1332, p. 2-7.

Smythe, Robert: "Interferometry: Asphere interferometry powers precision lens manufacturing", Laser Focus World, Oct. 2006.

Optical Shop Testing, Second Edition, edited by Daniel Malacara, Wiley Interscience Punlication (1992), Chapters 2, 12 and 15.

* cited by examiner

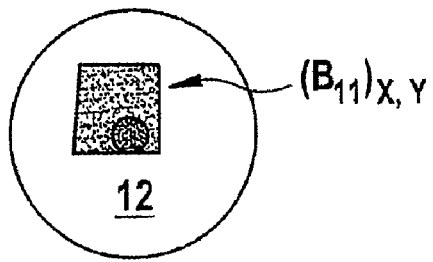
Fig. 24a
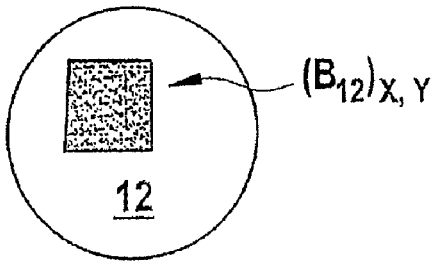
Fig. 24b
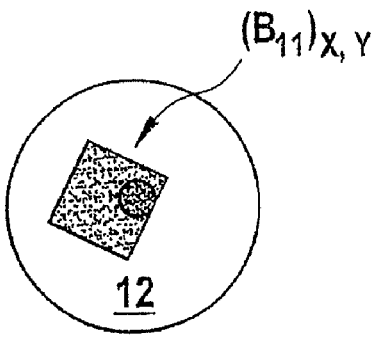
Fig. 24c
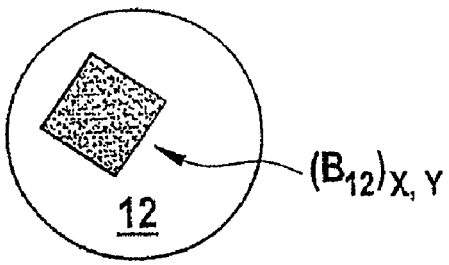
Fig. 24d
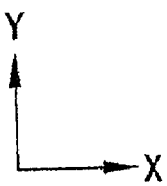

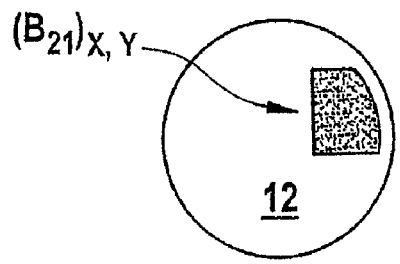
Fig. 25a
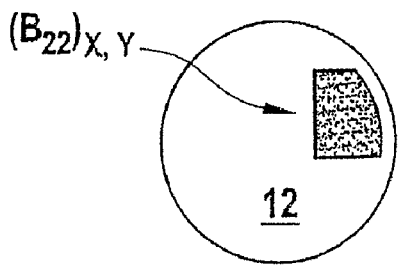
Fig. 25b
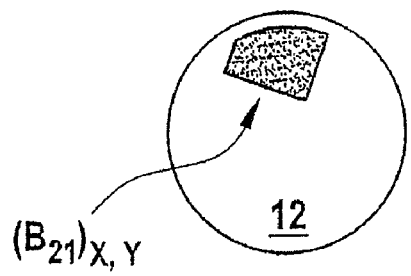
Fig. 25c
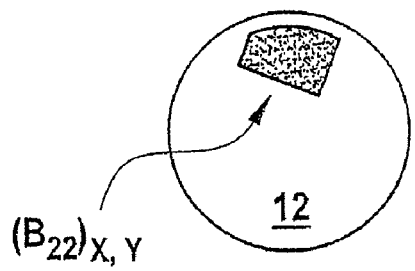
Fig. 25d
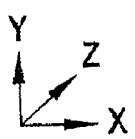

METHOD OF MEASURING A DEVIATION OF AN OPTICAL SURFACE FROM A TARGET SHAPE

This application is a Divisional of U.S. application Ser. No. 12/684,600, filed on Jan. 8, 2010, which is a continuation of International Patent Application PCT/EP2008/005548, filed on Jul. 8, 2008, and claiming priority from International Patent Application PCT/EP2007/006069, filed on Jul. 9, 2007. The complete disclosures of these patent applications are incorporated into this application by reference.

FIELD OF AND BACKGROUND OF THE INVENTION

The present invention relates to a method of aligning at least two wave shaping elements of a measuring apparatus for interferometrically measuring a deviation of an optical surface from a target shape. Further, the invention relates to a method of measuring a deviation of an optical surface from a target shape, a method of manufacturing an optical element having an optical surface of an aspherical target shape. Additionally, the present invention relates to large aspheres or small aspheres having a large numerical aperture.

An optical surface to be measured can be the surface of an optical lens element or an optical mirror used in optical systems. Such optical systems can e.g. be configured as telescopes used in astronomy, and systems used for imaging structures, such as structures formed on a mask or a reticle, onto a radiation sensitive substrate, such as resist, by a lithographic method. The quality of such optical systems is substantially determined by the accuracy with which the optical surface can be machined or manufactured to have a target shape determined by a designer of the optical system. In such manufacturing it is necessary to compare the actual shape of the machined optical surface with its target shape and to determine differences between the machined and the target surfaces. The optical surface may then be further machined especially at those portions where differences between the machined and target surfaces exceed, for example, predefined thresholds.

Interferometric measuring apparatuses are commonly used for high precision measurements of optical surfaces. Examples of such apparatuses are disclosed in WO2005/114101. The entire content of this document is incorporated herein by reference.

An interferometric measuring apparatus for measuring a spherical optical surface typically includes a source of sufficiently coherent light and interferometer optics for generating a beam of measuring light incident on the surface to be tested, such that wave fronts of the measuring light have, at a position of the surface to be tested, the same shape as the target shape of the surface under test. In such a situation, the beam of measuring light is orthogonally incident on the surface under test, and is reflected therefrom to travel back towards the interferometer optics. Thereafter, the light of the measuring beam reflected from the surface under test is superimposed with light reflected from a reference surface and deviations between the shape of the surface under test and its target shape are determined from a resulting interference pattern.

While spherical wave fronts for testing spherical optical surfaces may be generated with a relatively high precision by conventional interferometer optics, more advanced optics, such as computer generated holograms (CGH's) are mostly necessary to generate beams of measuring light having an aspherical wave front such that the light is orthogonally incident at each location of an aspherical surface under test.

However, the size of CGH's available is limited, which in return limits the size of the aspherical optical surfaces testable with high accuracy, in particular if the optical surface is convex or raised.

SUMMARY OF THE INVENTION

It is an object of the invention to solve the above-mentioned problems and in particular provide a method and a measuring apparatus by means of which the deviation of an actual shape of an optical surface from a target shape can be measured with high accuracy for large optical surfaces.

This object is solved according to the invention by providing a method of aligning at least two wave-shaping elements of a measuring apparatus for interferometrically measuring a deviation of an optical surface from a target shape, each of which wave shaping elements comprises a diffractive measurement structure for adapting part of a wave front of incoming light to a respective portion of the target shape, which method comprises the steps of: providing a first one of the wave-shaping elements with a diffractive alignment structure, arranging the wave shaping elements relative to each other such that each of the diffractive measurement structures is traversed by a separate subset of rays of the incoming light during operation of the measuring apparatus, and aligning the first wave shaping element and a second one of the wave shaping elements relative to each other by evaluating alignment light having consecutively interacted with the diffractive alignment structure and with the second wave shaping element.

The object is further solved according to the invention by providing a method of measuring a deviation of an optical surface from a target shape, which method comprises the steps of: generating incoming light having a wave front, providing at least two wave shaping elements, each having a diffractive measurement structure for adapting part of the wave front to a respective portion of the target shape, aligning the wave shaping elements according to the above-mentioned alignment method, illuminating the optical surface with the incoming light having traversed the diffractive measurement structures and thereby generating measuring light having interacted with the optical surface, and performing an interferometric measurement by superimposing reference light with at least a portion of the measuring light. Based on the interferometric measurement a deviation of the optical surface from the target shape can be determined. Further, the object is solved according to the invention by providing a method of manufacturing an optical element having an optical surface of an aspherical target shape, the method comprising the steps of: measuring a deviation of the optical surface according to the above-mentioned method and processing the optical surface based on the measured deviation.

The above-mentioned object is further solved by providing a measuring apparatus for interferometrically measuring a deviation of an optical surface from a target shape. The measurement apparatus according to the invention comprises means for generating incoming light having a wave front, at least two wave shaping elements, each having a diffractive measurement structure for adapting part of the wave front to a respective portion of the target shape, which wave shaping elements are arranged relative to each other such that each of the diffractive measurement structures is traversed by a separate subset of rays of the incoming light during operation of the measuring apparatus, wherein a first one of the wave shaping elements comprises a diffractive alignment structure adapted for aligning the first wave shaping element and a second one of the wave shaping elements relative to each other by evaluating alignment light having consecutively interacted with the diffractive alignment structure and with the second wave shaping element. In an embodiment according to the invention the measuring apparatus is adapted for illuminating the optical surface with the incoming light having traversed the diffractive measurement structures and thereby generating measuring light having interacted with the optical surface, and the measuring apparatus further comprises means for performing an interferometric measurement by superimposing reference light with at least a portion of the measuring light.

The incoming light according to the invention can be generated by an illumination beam of one interferometer or by respective illumination beams of several interferometers. The wavelength of the incoming light can be in the visible or in the non visible wavelength range, for example in a UV-wavelength range. The diffractive measurement structures are, as mentioned above, configured to adapt part of the wave front of the incoming light to a respective portion of the target shape. That means, the incoming light is adapted such that it is orthogonally incident on the optical surface in an extended region thereof, in case the optical surface has its target shape.

By using diffractive measurement structures, such as holograms like computer generated holograms (CGH's), for adapting the wave front of the incoming light, an optical surface having an aspherical target shape can be measured. The diffractive alignment structure provided on a first wave shaping element can also comprise a CGH. The diffractive pattern of the diffractive alignment structure differs from the diffractive patterns of the diffractive measurement structures. In an embodiment of the invention the diffractive alignment structure is further locally separated from the diffractive measurement structure of the respective wave shaping element.

According to the invention, the wave shaping elements are arranged relative to each other such that each of the diffractive measurement structures is traversed by a separate subset of rays of the incoming light during operation of the measuring apparatus. That means, there is a portion of the incoming light, which traverses the first wave shaping element but not the second wave shaping element and there is another portion of the incoming light which traverses the second wave shaping element but not the first wave shaping element. The wave shaping elements can be arranged in order to overlap or not to overlap in projection along the propagation direction of the incoming light. Put in different words, the wave shaping elements are arranged adjacent to each other with respect to the propagation direction of the incoming light. In an embodiment the wave shaping elements are arranged in a single plane or in different planes transverse to the propagation direction of the incoming light.

According to the invention, the first wave shaping element and the second wave shaping element are aligned relative to each other by evaluating alignment light having consecutively interacted with the diffractive alignment structure and the second wave shaping element. Therefore, the alignment light first interacts with the diffractive alignment structure and after that with the second wave shaping element. Therefore, the wave shaping elements are aligned directly to each other, i.e. not via a third element, such as via the optical surface or via an optical element of the measuring apparatus. The interferometric measurement is performed by superimposing reference light with at least a portion of the measuring light and can be performed by different interferometric methods known in the art. Suitable interferometer systems can be of the Fizeau or the Twyman-Green type, examples of which are illustrated in Chapter 2.1 of the text book edited by Daniel Malacara, Optical Shop Testing, Second Edition, Wiley Interscience Publication (1992). Also a Michelson-Type interferometer and any other suitable type of interferometer may be used.

By aligning the first wave shaping element and the second wave shaping element according to the invention by evaluating alignment light having consecutively interacted with the diffractive alignment structure and the second wave shaping element, the wave fronts adapted by the respective diffractive measurement structures match each other particularly well. This allows the measurement of the deviations of an optical surface being larger than the size of a single diffractive measurement structure, such as a CGH, in particular having a convex shape, from its target shape with high accuracy.

As according to the invention the alignment is performed by evaluating alignment light having consecutively interacted with the diffractive alignment structure and the second wave shaping element, the wave shaping elements are aligned directly to each other. This leads to a more precise alignment compared to individual alignments of the wave shaping elements to a third element.

In an embodiment of the alignment method according to the invention the alignment light is light from the incoming light. According to this embodiment part of the incoming light is used as alignment light and another part of the incoming light is sent via the diffractive measurement structures onto the optical surface. In a further embodiment the incoming light has a spherical wave front. The incoming light can e.g. be generated by a light source producing a plane wave and a pre-shaping optical element transforming the same into a spherical wave.

In a further embodiment of the invention the diffractive alignment structure focuses the alignment light onto a reflective surface of the second wave shaping element. Thereby the diffractive alignment structure generates a converging auxiliary wave, for example having a spherical wave front, being focused onto the reflective surface. This focussing condition is also referred to as cat-eye focus. The reflected light can be used for determining the distance between the two wave shaping elements in a direction of the incoming light, which is typically parallel to the optical axis of the measuring apparatus.

In a further embodiment according to the invention the diffractive alignment structure comprises a hologram, in particular a computer generated hologram (CGH). Such a hologram allows a manipulation of the wave front of the alignment light in a suitable way in order to optimise the alignment process.

In a further embodiment according to the invention the diffractive alignment structure has at least two substructures, each of which substructure is adapted to a separate optical wavelength. Advantageously the substructures are configured such that alignment light for each of the separate optical wavelengths is adapted by the diffractive alignment structure to the same wave. Therefore, the alignment between the two wave shaping elements can be performed in the same manner for each of the separate optical wavelengths. This way the measurement structures of the wave shaping elements can be easily operated with different optical wavelengths of the incoming light. In particular, the optical wavelengths can be selected such that for a first optical wavelength the diffractive measurement structures create a wave front adapted to a first optical surface, and for a second optical wavelength of the incoming light the diffractive measurement structures adapt the wave front to a second optical surface. For that purpose the diffractive measurement structures can e.g. be double coded and therefore contain two substructures, each of which is adapted to one of the optical wavelengths.

The diffractive alignment structures having two substructures, according to this embodiment, can be operated using the incoming light of the different wavelengths as alignment light.

According to a further embodiment each of the wave shaping elements is provided with a diffractive alignment structure and the wave shaping elements are aligned relative to each other using each of the diffractive alignment structures. In this way a particularly precise alignment between the wave shaping elements can be obtained.

In a further embodiment according to the invention the diffractive alignment structure generates an auxiliary wave, which is directed at a further diffractive alignment structure provided on the second wave shaping element. The light of the auxiliary wave having interacted with the further diffractive alignment structure allows the relative alignment between the two wave shaping elements to be determined with a high degree of accuracy. In an embodiment the auxiliary wave has a non-plane wave front. Therefore, the auxiliary wave is either a diverging or a converging wave, wherein the wave front can be, for example, spherical.

In a further embodiment according to the invention the further diffractive alignment structure provided on the second wave shaping element acts as a Littrow grating. As is known in the art, a Littrow grating is configured such that a wave reflected by the Littrow grating travels back within itself. The light of the auxiliary wave reflected back from the Littrow grating can be used to determine both the distance between the two wave shaping elements with respect to the propagation direction of the incoming light as well as the relative position of the two wave shaping elements in a lateral direction with respect to the propagation direction of the incoming light. This alignment information can be obtained by superimposing the reflected light of the auxiliary wave with reference light of the measuring apparatus and evaluating the resulting interferogram. In other words, according to this embodiment of the invention, both the axial distance and the decentration of the two wave shaping elements can be determined relative to each other.

In a further embodiment according to the invention the diffractive alignment structure generates a plane auxiliary wave having a propagation direction, which is tilted with respect to the direction of the propagation direction of the incoming light. This way, the decentration between the two wave shaping elements being the relative position between the two wave shaping elements in a lateral direction with respect to the propagation direction of the incoming light can be measured with a high accuracy. The tilt of the plane auxiliary wave with respect to the propagation direction of the incoming light can for example be in the area of 25°. In another embodiment the auxiliary wave is also directed onto a further diffractive alignment structure provided on the second wave shaping element acting as a Littrow grating. It is furthermore advantageous, if the diffractive alignment structure further focuses light on a reflective surface of the second wave shaping element in a cat-eye fashion in order to determine the axial distance between the two wave shaping elements.

In a further embodiment according to the invention the first wave shaping element comprises a second alignment structure, in particular a diffractive alignment structure, for aligning the tilt of the first wave shaping element relative to a propagation direction of the incoming light. In other words, the second alignment structure has the function of adjusting the tilt angle of a surface normal on the wave shaping element with respect to the propagation direction of the incoming light or the optical axis of the measuring apparatus. Advantageously, the second alignment structure comprises a Littrow grating. In a further embodiment the second wave shaping element also comprises an alignment structure for aligning the tilt of the second wave shaping element relative to a propagation direction of the incoming light. Advantageously, this alignment structure is also a diffractive alignment structure comprising a Littrow grating In a further embodiment according to the invention, the incoming light has a propagation direction and the wave shaping elements are offset from each other in the propagation direction. In other words, the wave shaping elements are placed in a cascaded arrangement along the propagation direction. Further the wave shaping elements are laterally shifted relative to each other. In this arrangement an alignment of the wave shaping elements relative to each other can be conducted with a particularly high accuracy.

According to a further embodiment of the invention, the wave shaping elements are arranged such that adjacent wave shaping elements overlap in projection along the propagation direction. In other words, the wave shaping elements are arranged such that there is an overlapping area between the wave shaping elements in which rays from the incoming light would have to pass both wave shaping elements in order to pass on to the optical surface. In this arrangement the relative alignment between the wave shaping elements can be achieved with a particularly high accuracy using the diffractive alignment structure according to the invention.

In a further embodiment according to the invention the wave shaping elements are aligned relative to each other with a tolerance of less than 100 nm. This tolerance applies both in axial and lateral directions of alignment with respect to the optical axis of the measuring apparatus.

The above object is further solved according to the invention by providing a method of measuring a deviation of an optical surface from a target shape comprising the steps of generating incoming light having a wave front, providing at least two diffractive measurement structures, each for adapting part of the wave front to a respective portion of the target shape, and arranging the diffractive measurement structures relative to each other such that each diffractive measurement structure is traversed by a separate subset of rays of the incoming light, wherein each diffractive measurement structure has a respective surface normal and the surface normals are tilted relative to each other, illuminating the optical surface with the incoming light having traversed the diffractive measurement structures and thereby generating measuring light having interacted with the optical surface, performing an interferometric measurement by superimposing reference light with at least a portion of the measuring light, and determining a deviation of the optical surface from the target shape based on the interferometric measurement.

The above object is further solved by a method of manufacturing an optical element having an optical surface of an aspherical target shape, which method comprises the steps of: measuring a deviation of the optical surface according to the above method of measuring a deviation of an optical surface from a target shape, and processing the optical surface based on the measured deviation.

The above object is further solved by a measuring apparatus for measuring a deviation of an optical surface from a target shape, which measuring apparatus comprises means for generating incoming light having a wave front, at least two diffractive measurement structures, each for adapting part of the wave front to a respective portion of the target shape, which diffractive measurement structures are arranged relative to each other such that each of the diffractive measurement structures is traversed by a separate subset of rays of the incoming light during operation of the measuring apparatus, wherein each diffractive measurement structure has a respective surface normal and the surface normals are tilted relative to each other, which measuring apparatus is adapted for illuminating the optical surface with the incoming light having traversed the diffractive measurement structures and thereby generating measuring light having interacted with the optical surface, and which measuring apparatus further comprises means for performing an interferometric measurement by superimposing reference light with at least a portion of the measuring light. From the interferometric measurement a deviation of the optical surface from the target shape can be determined. Advantageously, the measuring apparatus further comprises means for determining such a deviation of the optical surface from the target shape based on the interferometric measurement.

In other words, according to the invention the diffractive measurement structures are tilted relative to each other. The tilt between the surface normals of the diffractive measurement structures is advantageously at least 1°, in one embodiment, according to the invention, between 20° and 90°.

The method according to the invention of tilting the surface normals of the measurement structures relative to each other allows a convex or raised optical surface to "immerse" into the diffractive measurement structures. The tilted diffractive measurement structures approximate the shape of a convex optical surface better than diffractive measurement structures arranged in the same plane. Therefore, the area of the optical surface to be measured can be moved closer to the diffractive measurement structures if the surface normals are tilted relative to each other. This allows a larger optical surface to be measured using diffractive measurement structures of a given size.

In case a convex optical surface of a size larger than the size measurable by two diffractive measurement structures arranged in a plane needs to be measured, the method according to the invention improves the measurement accuracy obtainable. That is, as according to the inventive solution the use of more than two diffractive measurement structures can be avoided, which would cause larger alignment uncertainties of the diffractive measurement structures relative to each other than in the case of only two diffractive measurement structures. By arranging the diffractive measurement structures with tilted surface normals according to the invention, the given optical surface can possibly be measured using only two diffractive measurement structures, which in return reduces the overall alignment inaccuracies. This leads to a more accurate measurement result of the deviations of the optical surface.

In a further embodiment according to the invention the surface normals are tilted such that the wave shaping elements form a roof-shaped structure, which is adapted such that the optical surface having a convex shape can at least partly be inserted therein. In this way the average distance between the optical surface to be measured and the diffractive measurement structures can be reduced allowing the measurement of a larger optical surface.

In a further embodiment according to the invention the incoming light comprises two separate light beams, each of which propagates along a respective surface normal of the diffractive measurement structures. Therefore, the light beams are tilted relative to each other as are the surface normals of the diffractive measurement structures. According to this embodiment the propagation directions of the respective light beams do not have to be deviated as much by the diffractive measurement structures, which allows a more accurate measurement of the surface deviation. In a further embodiment, the separate light beams are the illumination beams of separate interferometers.

A further embodiment of the measuring method according to the invention includes the following steps: illuminating a first area of the optical surface with the incoming light having traversed the diffractive measurement structures and thereby generating first measuring light having interacted with the first areas, generating second measuring light having interacted with at least a second area of the optical surface and determining the wave front of the second measuring light, designated as a second wave front, by performing a second interferometric measurement, and determining the deviation of the optical surface from the target shape based on the first and the second interferometric measurements. In this way, an optical surface of an increased size can be measured using a given number of wave shaping elements. Further embodiments relating to determining the deviation of the optical surface from the target shape based on the first and the second interferometric measurements are illustrated hereinafter.

The above-mentioned object is further solved according to the invention by a method of measuring a deviation of an optical surface from a target shape comprising the steps of: generating incoming light having a wave front, providing at least two diffractive measurement structures, each for adapting part of the wave front to a respective portion of the target shape and arranging the diffractive measurement structures relative to each other such that each of the diffractive measurement structures is traversed by a separate subset of rays of the incoming light, illuminating a first area of the optical surface with the incoming light having traversed the diffractive measurement structures and thereby generating first measuring light having interacted with the first area, determining the wave front of the first measuring light, designated as a first wave front, by performing a first interferometric measurement, generating second measuring light having interacted with at least a second area of the optical surface, and determining the wave front of the second measuring light, designated as a second wave front, by performing a second interferometric measurement, determining a deviation of the optical surface from the target shape using a stitching algorithm, which stitching algorithm includes: determining misalignment components of the at least two diffractive measurement structures based on the first wave front and the second wave front. The second area is different from the first area but can overlap with the first area.

The above object is further solved by a method of manufacturing an optical element having an optical surface of an aspherical target shape, wherein the method comprises the steps of measuring a deviation of the optical surface according to the aforementioned method, and processing the optical surface based on the measured deviation.

Further, the above object is solved by a measuring apparatus for measuring a deviation of an optical surface from a target shape which measuring apparatus comprises: means for generating incoming light having a wave front, at least two diffractive measurement structures, each for adapting part of the wave front to a respective portion of the target shape, which wave shaping elements are arranged relative to each other such that each diffractive measurement structure is traversed by a separate subset of rays of the incoming light during operation of the measuring apparatus, which measuring apparatus is adapted for illuminating first areas of the optical surface with the incoming light having traversed the diffractive measurement structures, thereby generating measuring light having interacted with the first areas of the optical surface, and generating second measuring light having interacted with at least a second area of the optical surface, and which measuring apparatus further comprises: means for performing a first interferometric measurement for determining the wave front of the first measuring light, means for performing a second interferometric measurement for determining the wave front of the second measuring light, designated as a second wave front, and means for determining a deviation of the optical surface from the target shape using a stitching algorithm, which stitching algorith includes determining misalignment components of the at least two diffractive measurement structures based on the first wave front and the second wave front.

By determining the misalignment components of the at least two wave shaping elements based on the first wave front and the second wave front according to the invention, the misalignment components can be accounted for by the stitching algorithm when stitching the first wave front and the second wave front together. In an embodiment according to the invention, the deviation of the optical surface from the target shape is determined based on the first wave front, the second wave front and the misalignment components. By virtue of the stitching algorithm, according to the invention, the wave shaping elements only have to be roughly aligned before determining the wave fronts. The alignment only has to be performed such that the first wave front and the second wave front are arranged in a way, in which a continuous wave front can be measured. The second area advantageously abuts to the first area such that stitching between the respective wave fronts can be performed. The stitching algorithm according to the invention allows a very precise measurement of the deviation of the optical surface from its target shape, as possible misalignments between the two diffractive measurement structures are compensated for by the stitching algorithm. Further, complex and costly alignment procedures become unnecessary for measuring the optical surface.

The incoming light used for measuring the deviation of the optical surface can be generated by the illumination beam of a single interferometer or can be composed from respective illumination beams of several interferometers. The interferometric measurements are conducted by respectively superimposing the measuring light with reference light, as also detailed above. The determined wave front deviations correspond to deviations of the optical surface from its target shape in the respective areas. Determining a wave front of the respective measuring light according to the invention is to be understood as either determining the actual shape of the wave front or the shape of a deviation distribution of the respective wave front from the wave front of the reference light.

In an embodiment according to the invention the first area comprises at least two separate sub areas having a gap in between and the second area covers this gap. For example, the two wave shaping elements can be arranged in an overlapping fashion such that the light traversing the wave shaping elements in the non overlapping area interacts with the two separate subareas of the first area. The area of the optical surface corresponding to the overlapping section of the wave shaping elements is then measured in a second measurement step using the second measuring light. Advantageously the determining of the deviation of the optical surface includes determining respective deviation distributions for the first and the second areas from the first and the second interferometric measurements, respectively, and mathematically stitching the deviation distributions together to obtain an overall deviation distribution. The overall deviation distribution covers the whole area of the first and the second areas of the optical surface.

In a further embodiment according to the invention the target shape of the optical surface is rotationally symmetric with respect to an attributed axis of symmetry, the first interferometric measurement is performed with the optical surface being arranged in a first rotational position and the second interferometric measurement is performed with the optical surface being arranged in a second rotational position different from the first rotational position. In one embodiment the axis of symmetry of the optical surface extends parallel to the propagation direction of the incoming light. Alternatively, the axis of symmetry extends laterally with respect of the propagation direction. In both embodiments the same wave shaping elements can be used for the first and the second interferometric measurements. In order to arrange the optical surface in the different rotational positions, it is advantageous if a pivot bearing is provided for rotating the test object comprising the optical surface. This way different sub-apertures on the optical surface can be measured.

In a further embodiment according to the invention, the first interferometric measurement is performed using a first set of diffractive measurement structures and the second interferometric measurement is performed using a second set of diffractive measurement structures, which second set of diffractive measurement structures is shifted with respect to the first set of diffractive measurement structures and has correspondingly adapted diffractive measurement structures. In other words, the diffractive measurement structures of the first set of diffractive measurement structures are adapted to shape the wave front of the incoming light to match the target shape in the first area of the optical surface and the diffractive measurement structures of the second set of diffractive measurement structures are adapted to the target shape in the second area of the optical surface. In this way, a large optical surface can be measured, even if it is not symmetric. Therefore a so-called free form surface of large size can be measured according to this embodiment.

In a further embodiment of the invention the determined misalignment components include alignment offsets of each diffractive measurement structure, which alignment offsets include an offset value for each degree of freedom in alignment of the respective diffractive measurement structure. Each diffractive measurement structure can, for example, have 6 degrees of freedom in alignment such as tilt in two directions, decentration of the diffractive measurement structure in two lateral directions with respect to the optical axis of the measuring apparatus, the azimuthal angle with respect to the optical axis and the distance of the wave shaping element from the optical surface. In case of linear dependence between single degrees of freedom, the offset values can be reduced correspondingly.

In a further embodiment, according to the invention, the determining of the misalignment components includes determining a sensitivity distribution $(B_{kl})_{x,y}$ for each wave shaping element which sensitivity distribution $(B_{kl})_{x,y}$ describes the influence of a given misalignment of a respective diffractive measurement structure k in a respective degree of freedom l on the first wave front as a function of coordinates x and y in a projection plane perpendicular to a propagation direction of the first measuring light and minimising a mathematical term including the following expression:

$$\sum_{l=1}^{Af} b_{kl} \cdot (B_{kl})_{x,y}, \tag{1}$$

wherein $b_{kl}$ is a respective misalignment coefficient of a respective diffractive measurement structure k and a respective degree of freedom l, and Af is the number of degrees of freedom in alignment of the diffractive measurement structures. In a further embodiment of the invention the expression (1) is subtracted from the first wave front and the result included squared in the mathematical term to be minimised.

In a further embodiment according to the invention, at least one of the sensitivity distributions $(B_{kl})_{x,y}$ can be expressed by several other sensitivity distributions $(\tilde{B}_{kl})_{x,y}$. That means, a certain type of misalignment, for example a tilt, of a given diffractive measurement structure, causes the same effect to the resulting wave front, for example the appearance of coma, as does a linear combination of other misalignment components of the given diffractive measurement structure. Often the azimuth sensitivity distribution can be described by a linear combination of tilt and decentring sensitivity distributions. In case at least two sensitivity distributions being linearly dependent on each other, the number of alignment offsets to be determined by the measurement method according to the invention, is reduced.

In an embodiment according to the invention, the misalignment coefficients $b_{kl}$ are fitting coefficients determined from a least square calculation.

Advantageously the determining of the misalignment components includes determining a sensitivity distribution $A_{jk,y}$ of the optical surface describing the influence of a given misalignment of the optical surface in a respective degree of freedom j on the first wave front as a function of the coordinates x and y, and minimizing a mathematical term including the following expression:

$$\sum_{j=1}^{AJ} [a_{mj} - a_{nj}] \cdot A_{jx,y}, \quad (2)$$

wherein $a_{mj}$ and $a_{nj}$ are respective misalignment coefficients of the optical surface for respective rotational positions m and n and AJ is the number of degrees of freedom in alignment of the optical surface. Typical degrees of freedom in alignment of the optical surface include tilt in two directions with respect to the optical axis of the measuring apparatus, decentration in two lateral directions with respect to the optical axis and the distance of the diffractive measurement structure with respect to the optical surface. By including the expression (2) into the mathematical term to be minimised, the misalignment components of the optical surface can be properly accounted for in the stitching algorithm.

In a further embodiment according to the invention, prior to performing the first interferometric measurement the distance between one of the diffractive measurement structures, acting as a reference element, and the optical surface is adjusted. In an embodiment of the invention, the wave shaping element acting as a reference element is a central wave shaping element which is arranged such that the light from the incoming light traversing the central wave shaping element illuminates the optical surface in a central region, in particular in an area of an axis of symmetry. Performing the above-mentioned adjustment in distance between the reference element and the optical surface allows misalignment components of the diffractive measurement structures to be determined subsequently in a particularly precise manner using the stitching algorithm.

In a further embodiment according to the invention, prior to performing the first interferometric measurement the diffractive measurement structures are roughly aligned such that a continuous wave front of the first measuring light can be measured during the first interferometric measurement. Advantageously, the rough alignment is done such that half of the period of an interference pattern generated by the first measuring light and the reference light covers at least two pixels of a detector recording the interference pattern. Advantageously, each of the diffractive measurement structures is mounted on an alignment device. In an embodiment of the alignment device, the respective diffractive measurement structure can be adjusted in 6 degrees of freedom (decentration x, decentration y, tilt x, tilt y, azimuth angle and distance z, wherein the optical axis of the measurement apparatus extends along z).

In a further embodiment, according to the invention, the alignment includes at least one of the steps: roughly aligning a first diffractive measurement structure acting as a reference element with respect to another component of the measuring apparatus, adjusting the distance of the reference element with respect to the optical surface, and roughly aligning at least one other diffractive measurement structure. The distance of the reference element with respect to the optical surface can, for example, be adjusted using a cat-eye auxiliary grating on the wave shaping element carrying the diffractive measurement structure or using optical coherence tomography (OCT), a Littrow grating or an autocollimator etc. The alignment of the at least one other diffractive measurement structure can be performed with respect to another component of the measuring apparatus or with respect to the optical surface.

It is a further object of the invention to provide an asphere having improved properties. This object is solved, according to the invention, by an asphere having an aspherical optical surface extending over a diameter D of the asphere, wherein a best fitting spherical surface of the aspherical optical surface has a radius of curvature R, and the parameters D and R are related as follows:

$$D > 2R \cdot \sin\left(\arctan\frac{500 \text{ mm}}{2R}\right) \quad (3)$$

The manufacture of such an asphere is made possible by the manufacturing method according to the invention. Currently available CGH's have a diameter of less than 300 mm. An aspherical optical surface having parameters satisfying the relation (3) cannot be measured properly using a single CGH. This is even not possible, if the optical surface is rotationally symmetric, the optical surface is measured in different rotational positions and the results are stitched together.

In case, in which the aspherical optical surface is convex, the light emanating from the CGH converges towards the optical surface. Therefore, in order to measure such a convex surface using a single CGH a CGH having a diameter larger than 300 nm would be required. Also in the case, in which the radius of curvature R is very large relative to the diameter of a CGH, i.e. the aspherical optical surface extends essentially along a plane, the size of currently available CHG's is not sufficient to measure the optical surface using a single CGH.

In the case, in which the aspherical optical surface is concave, the light emanating from the CGH diverges towards the optical surface. The measurement of an asphere having the above parameters by means of a single CGH would require the CGH to be arranged a large distance away from the optical surface. That is, as in close proximity to such a concave aspherical optical surface single rays of the measuring light intersect with each other. If the CGH was located in this area, the measurements would be indeterminate. Therefore, the CGH has to be located outside of this area. According to a first option the CGH can be located in very close proximity to the optical surface, which would require the CGH to be larger than currently available, in order to measure the entire optical surface. According to another option, the CGH can be located in an area far away from the optical surface, in which the single rays of the measuring light do not intersect. In this arrangement, however, the measurement accuracy is reduced to an inacceptable level.

An optical surface being characterized by (3) can however be measured by the above measuring method according to the invention using at least two diffractive measurement structures in form of e.g. CGH's.

In a further embodiment according to the invention, D and R are related as follows:

$$D > 2R \cdot \sin\left(\arctan\frac{600 \text{ mm}}{2R}\right) \quad (4)$$

Advantageously, the asphere is produced by the above-mentioned method of manufacturing an optical element according to the invention.

The object is further solved by providing an asphere having an aspherical optical surface extending over a diameter D of the asphere, wherein a best fitting spherical surface of the aspherical optical surface has a radius of curvature R of at least 130 mm and the ratio D/R is larger than 1.3. In another embodiment the ratio D/R is larger than 1.5, especially larger than 2.0. Advantageously, the asphere is also produced by the above method of manufacturing an optical element according to the invention.

The best fitting spherical surface of the aspherical optical surface is advantageously convex. As detailed above, this also includes a best fitting surface of plane shape, if the radius of curvature R becomes very large. In the case, in which the best fitting surface is plane, the aspherical optical surface can comprise subareas of convex and concave shapes next to each other. In an alternate embodiment the best fitting spherical surface of the aspherical optical surface is concave.

In an embodiment of the asphere according to the invention, the diameter D is larger 500 mm, advantageously larger than 600 mm. According to a further embodiment of the invention, the optical surface is rotationally symmetric with respect to an axis of symmetry.

Such a rotationally symmetric asphere may be represented by the following formula, which is known to the person skilled in the art as "asphere-equation":

$$z = \frac{cr^2}{1+\sqrt{1-(1+k)c^2r^2}} + \alpha_1 r^2 + \alpha_2 r^4 + \alpha_4 r^8 + \alpha_5 r^{10} + \alpha_6 r^{12} + \alpha_8 r^{14}$$

In this equation z represents the z-coordinate of the surface of the target shape at a distance r from the optical axis or axis of symmetry, c is the curvature of the aspherical surface, k is the conic coefficient, and $\alpha_i$ are further coefficients. An exemplary embodiment of the target shape is characterized by the following parameters for the above equation:
R=+668.5512 mm
c=1/r=1.49577·10$^{-3}$ mm$^{-1}$
k=0
$\alpha_1$=0
$\alpha_2$=−2.946315·10$^{-9}$ mm$^{-3}$
$\alpha_3$=8.333468·10$^{-14}$ mm$^{-5}$
$\alpha_4$=1.08029510·10$^{-17}$ mm$^{-7}$ In a further embodiment of the asphere, the optical surface is rotationally non-symmetric and the diameter D is larger than 300 mm. In case the optical surface has the shape of an ellipse according to this embodiment the largest diameter D is larger than 300 mm. The optical surface according to this embodiment can also be referred to as a free form surface. In this case, measuring the surface in different rotational positions using the same CGH is not possible. Therefore only the measuring method according to the invention using at least two diffractive measurement structures allows the measurement of an asphere of the above embodiment with sufficient accuracy. A free form surface may be represented by different mathematical functions, for example splines or simple xy-polynomials in the following form:

$$z = \sum_{n,m} a_{nm} x^n y^m$$

wherein z is the arrow height and n+m≦10 or ≦20. Such representations are supported by many optical design programs like Code V known to the person skilled in the art.

According to a further embodiment, the optical surface has a deviation from the best fitting spherical surface of at least 50 µm, in particular at least 100 µm. Aspherical optical surfaces having a deviation from the best fitting spherical surface of less than 100 µm are referred to as weak or mild aspheres which can often be measured with respect to their deviation from their target shape using spherical optical elements instead of diffractive measurement structures. According to a further embodiment, the optical surface has a deviation from the best fitting spherical surface of at least 200 µm.

In a further embodiment according to the invention the asphere is manufactured to a tolerance sufficient for microlithographic applications, in particular the actual shape of the optical surface deviates from a target shape of the optical surface by a maximum of 1 µm. The manufacture of an asphere having the above mentioned characteristics and having this tolerance is made possible by the manufacturing method according to the invention.

In a further embodiment according to the invention, the asphere has two convex optical surfaces, each being shaped aspherically. The ashpere, according to this embodiment, can also be referred to as a double-asphere. The parameters D and R of each of the two aspherical optical surfaces preferably meet the requirements set forth above with regards to the aspherical optical surface, in particular the requirements contained in equations (3) and (4).

According to the invention, further an arrangement of a multitude of the above-mentioned ashperes is provided wherein the actual shapes of the optical surfaces of the respective aspheres deviate from each other by a maximum of 5 µm. Such aspheres are suitable for use in microlithographic exposure tools due to their tight surface tolerances over a large diameter.

According to the invention, further a projection objective of a projection exposure tool for microlithography is provided, which projection objective comprises at least one of the above aspheres according to the invention. In one embodiment the projection objective is configured for operation with extreme ultraviolet light (EUV).

The features specified above with respect to the method according to the invention can be transferred correspondingly to the measuring apparatus according to the invention.

Advantageous embodiments of the measuring apparatus according to the invention resulting therefrom shall also be covered by the disclosure of the invention.

BRIEF DESCRIPTION OF THE DRAWINGS

The foregoing, as well as other advantageous features of the invention, will be more apparent from the following detailed description of exemplary embodiments of the invention with reference to the following diagrammatic drawings, wherein:

FIGS. 24a to 24d illustrate sensitivity distributions related to a first diffractive measurement structure according to FIG. 23;

FIGS. 25a to 25d illustrate sensitivity distributions related to a second diffractive measurement structure according to FIG. 23;

DETAILED DESCRIPTION OF EXEMPLARY EMBODIMENTS

Figure 1:
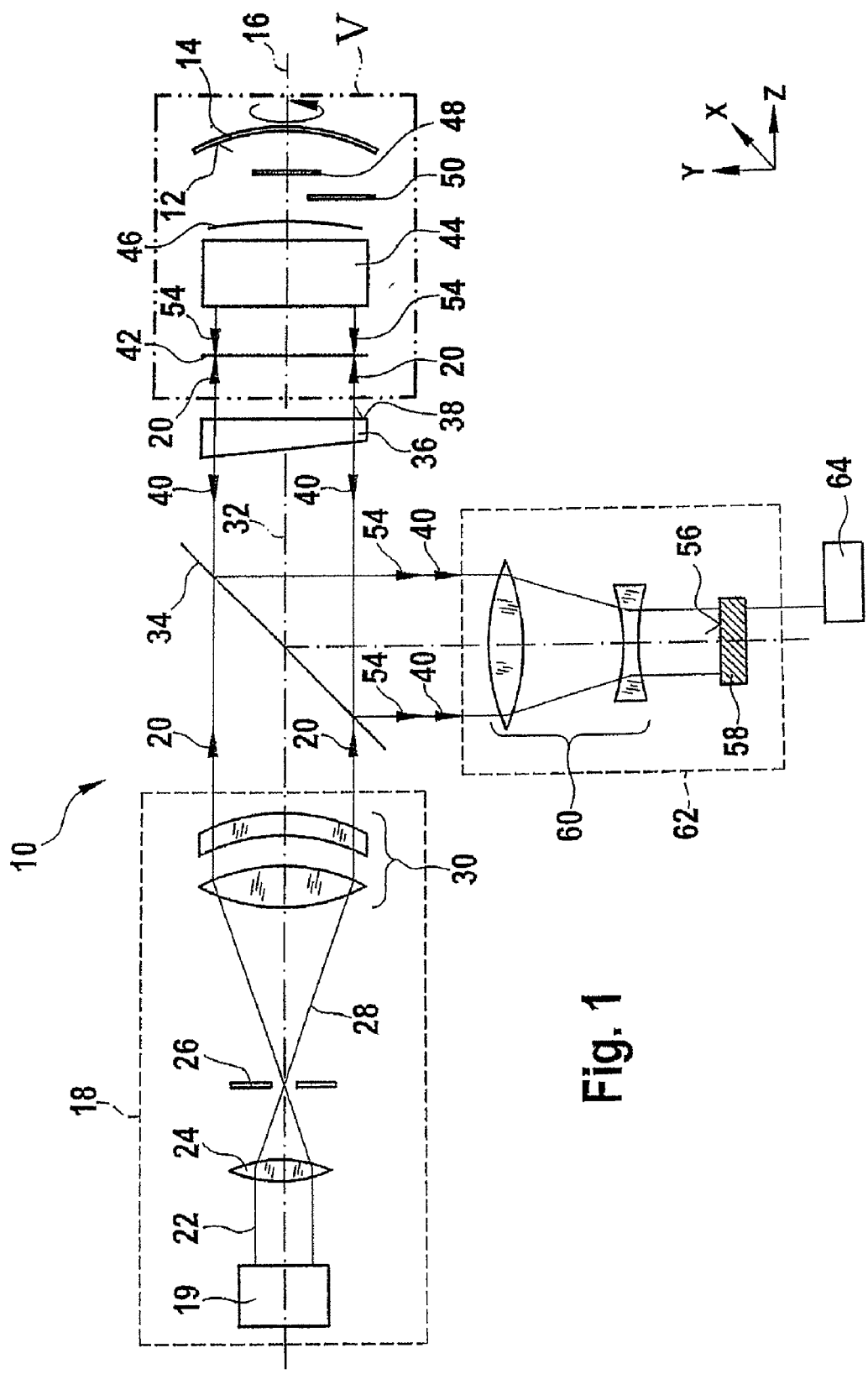
FIG. 1 illustrates a measuring apparatus for interferometrically measuring a deviation of an optical surface from a target shape according to a first embodiment of the invention.

In the embodiments of the invention described below, components that are alike in function and structure are designated as far as possible by the same or like reference numerals. Therefore, in order to fully understand the features of the individual components of a specific embodiment, the descriptions of other embodiments or the summary of the invention should be referred to.

FIG. 1 illustrates a measuring apparatus 10 in the form of an interferometer system according to an embodiment of the invention. The measuring apparatus 10 is used for interferometrically measuring a deviation of an aspherical optical surface 12 of a test object 14. The test object 14 can, for example, be a mirror or a transmissive optical lens etc. The test object 14 is mounted on a test piece holder, not shown in the drawings, which is rotatable about a rotational axis 16. The optical surface 12 has, in the shown embodiment, a rotationally symmetric shape about an axis of symmetry and the test object 14 is aligned and mounted such that the axis of symmetry substantially coincides with the rotational axis 16.

The measuring apparatus 10 comprises a light source unit 18 for generating an illumination beam 20. The light source unit 18 comprises a laser 19, such as a helium neon laser, emitting a laser beam 22. The laser beam 22 is focused by a focussing lens 24 onto a pinhole aperture of a spatial filter 26 such that a diverging beam 28 of coherent light emerges from the pinhole. The wave front of the diverging beam 28 is substantially spherical. The diverging beam 28 is collimated by a group of lens elements 30 to form the illumination beam 20 having a substantially flat wave front. The illumination beam 20 travels along an optical axis 32 of the measuring apparatus 10 and traverses a beam splitter 34. The optical axis 32 and the rotational axis 16 can be identical as shown in FIG. 1, but do not have to be parallel or identical.

In the following, the illumination beam 20 enters a Fizeau element 36 having a Fizeau surface 38. A portion of the light of the illumination beam 20 is reflected as reference light 40 by the Fizeau surface 38. The light of the illumination beam 20 traversing the Fizeau element 36 has a plane wave front 42 and enters optional pre-shaping optics transforming the light of the illumination beam into incoming light 46 having a spherical wave front.

Figure 5:
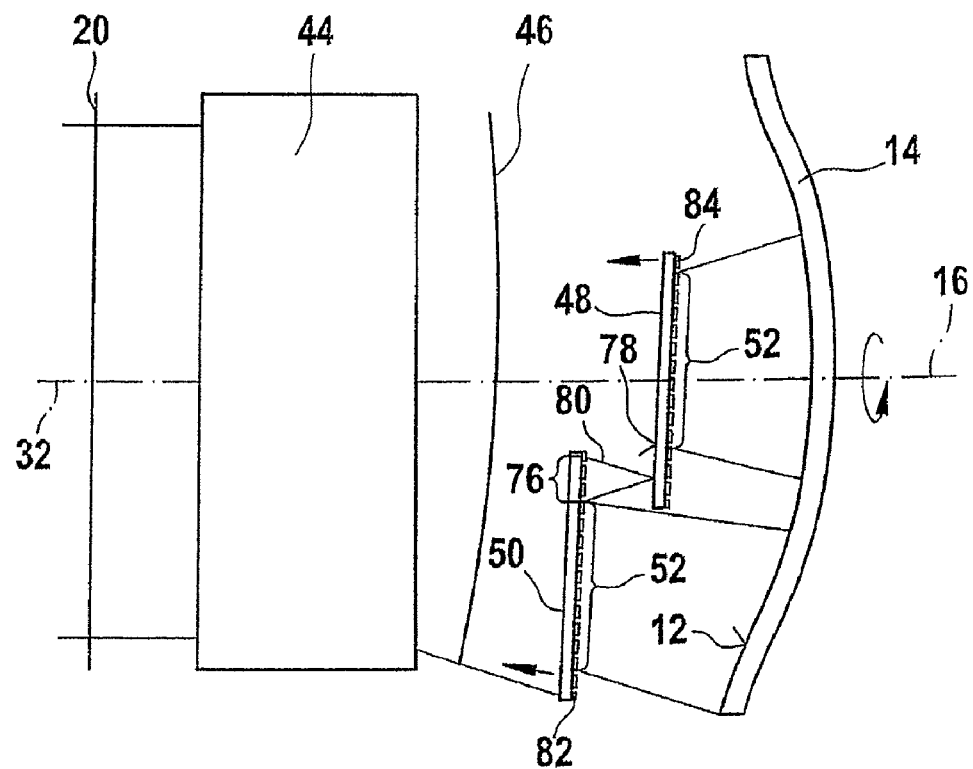
FIG. 5 illustrates a portion of the measuring apparatus according to FIG. 1 including a set of two wave shaping elements in a first embodiment.

The measuring apparatus 10 further comprises a first wave shaping element 48 and a second wave shaping element 50. The wave shaping elements 48 and 50 are arranged in a so called cascaded arrangement. The wave shaping elements 48 and 50 are shifted relative to each other both along the optical axis 32 as well as in a direction perpendicular to the optical axis 32. As shown in FIG. 5, the wave shaping elements 48 and 50 each comprise a diffractive measurement structure 52. The wave shaping elements 48 and 50 are arranged in the above-mentioned cascaded manner such that each of the diffractive measurement structures 52 is traversed by a separate subset of rays of the incoming light 46 during operation of the measuring apparatus 10. The diffractive measurement structures 52 each comprise a hologram, advantageously a computer generated hologram (CGH). Such a hologram allows the wave front of the incoming light 46 to be adapted to an aspherical shape.

The diffractive measurement structures 52 adapt the wave front of respective portions of the incoming light 46 to respective portions of the target shape of the optical surface 12. The wave front of the incoming light 46 is thereby shaped by the diffractive measurement structures 52 such that the light is orthogonally incident on the target shape of the optical surface 12 at each location thereof. Thus, if the optical surface 12 was precisely machined such that its surface shape corresponded to the target shape, the incoming light 46 shaped by the diffractive measurement structures 52 was orthogonally incident on the optical surface 12 at each location thereof.

Light reflected from the optical surface 12, referred to as measuring light 54, contains in its wave front the information on the deviation of the actual shape of the optical surface 12 from the target shape. As further shown in FIG. 1, the measuring light 54 then travels back substantially the same way as the incoming light 46, traverses the wave shaping elements 48 and 50, the pre-shaping optics 44, the Fizeau element 36, and a portion of the measuring light 54 will be reflected by the beam splitter 34. The measuring light 54 reflected by the beam splitter 34 is imaged onto a photosensitive surface 56 of a camera chip 58 through an objective lens system 60 of a camera 62 such that the optical surface 12 is imaged onto the camera chip 58.

A portion of the reference light 40 is also reflected by the beam splitter 34 onto the photosensitive surface 56 of the camera chip 58. The reference light 40 and the measuring light 54 generate an interference pattern on the photosensitive surface 56. The measuring apparatus 10 further comprises evaluation means 64, which are adapted for determining the deviation distribution of the optical surface 12 from the target shape based on the measured interference pattern.

Figure 2:
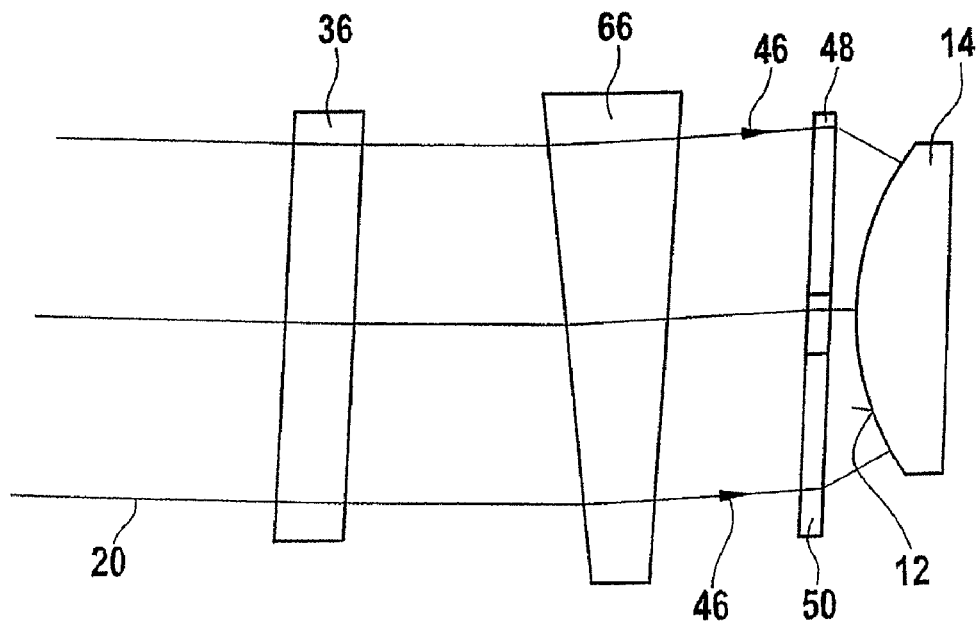
FIG. 2 illustrates a portion of a measuring apparatus for interferometrically measuring a deviation of an optical surface from a target shape according to a further embodiment of the invention.
Figure 3:
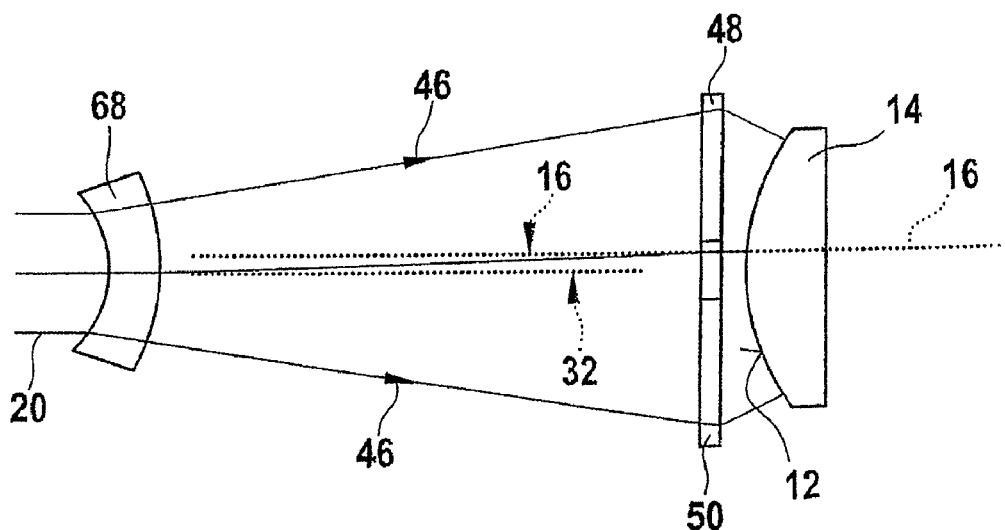
FIG. 3 illustrates a portion of a measuring apparatus for interferometrically measuring a deviation of an optical surface from a target shape according to a further embodiment of the invention.

FIGS. 2 and 3 show further embodiments of a portion of the measuring apparatus 10 arranged in the right section of FIG. 1. In the embodiment shown in FIG. 2, the propagation direction of the illumination beam 20 is tilted by a prism 66 such that the incoming light 46 is not directly orthogonally incident on the wave shaping elements 48 and 50. This way, reflexes disturbing the interferometric measurement are avoided. The wave shaping elements 48 and 50 in FIGS. 2 and 3 are shown in a schematic way and their arrangement as well as structure can be any of the embodiments illustrated herein.

In the embodiment shown in FIG. 3 a negative F-aplanar 68 is provided to transform the illumination beam 20 into a diverging beam of the incoming light 46. The optical axis 32 of the measuring apparatus 10 is shifted with respect to the rotational axis of the test object 14. In this way, errors of the diffractive measurement structures 52 are averaged out during the interferometric measurement at different rotational positions of the test object 14.

Figure 4:
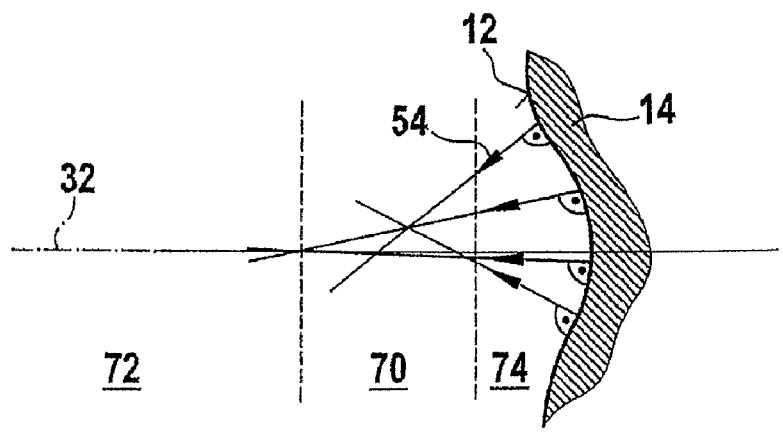
FIG. 4 illustrates optical effects related to measuring a deviation of a concave aspherical optical surface from a target shape.

FIG. 4 illustrates single rays of the measuring light 54 reflected by an embodiment of the optical surface 12 having an aspherical concave shape. The term "concave", as used in this application with respect to the optical surface 12, refers to a viewing direction along the propagation direction of the incoming light 46. The same applies to the use of the term "convex" with regards to the optical surface 12. As shown in FIG. 4, there is an area, referred to as "caustic area" 70, located a certain distance away from the test object 14, in which at least two rays of the measuring light 54 intersect with each other. Before and after the caustic area 70 with respect to the optical axis 32 so called unambiguous areas 72 and 74 are located, in which no single rays of the measuring light 54 intersect with each other. In case the wave shaping elements 48 and 50 are located in the "caustic area" 70 the measurement is indeterminate.

The wave shaping elements 48 and 50 therefore have to be located in one of the unambiguous areas 72 and 74 to allow for a meaningful measurement. In case of the wave shaping elements 48 and 50 being arranged in the unambiguous area 74, located between the "caustic area" 70 and the test object 14, the size of the diffractive measurement structures 52 have to be on the order of the size of the optical surface 12.

FIG. 5 shows a portion of the measuring apparatus designated as "V" in FIG. 1. The wave shaping elements 48 and 50 overlap in projection along the optical axis 32. In this area of overlap the second wave shaping element 50 comprises a first diffractive alignment structure 76 in the form of a computer generated hologram (CGH) which is adapted for focussing a portion of the incoming light 46 onto a reflective surface 78 on the first wave shaping element 48. The first diffractive alignment structure 76 thereby generates a spherical auxiliary wave 80 which focuses onto the reflective surface 78. Such a focusing condition is also referred to as a cat-eye focus condition.

The light reflected from the reflective surface 78 forms an interference pattern with the reference light 40 on the photosensitive surface 56 of the camera chip 58. This interference pattern is indicative of a distance between the two wave shaping elements 48 and 50 with respect to the surface normal of element 50. Therefore, the first diffractive alignment structure 76 allows the distance between the wave shaping elements 48 and 50 to be measured and subsequently to be adjusted. The second wave shaping element 50 further comprises a second diffractive alignment structure 82 acting as a Littrow grating. The second diffractive alignment structure 82 is arranged on a radially outer area of the second wave shaping element 50 with respect to the optical axis 32. The second diffractive alignment structure 82 allows measurement and adjustment of the tilt angle of the second wave shaping element 50 with respect to the optical axis 32. Also the first wave shaping element 48 comprises a diffractive alignment structure 84 acting as a Littrow grating which allows the tilt angle of the first wave shaping element 48 with respect to the optical axis 32 to be measured and adjusted.

Further, the wave shaping elements 48 and 50 can contain further diffractive structures (not shown in the drawings) to control the geometrical arrangement of the wave shaping elements 48 and 50 relative to the measuring apparatus 10 and to control the geometrical arrangement of the optical surface 12 of the test object 14 relative to the combination of the wave shaping elements 48 and 50 as described in the U.S. patent application Ser. No. 11/233,435.

The wave shaping elements 48 and 50 of the embodiment shown in FIG. 6 differ from the wave shaping elements 48 and 50 according to FIG. 5 as follows. The first diffractive alignment structure 176 of the second wave shaping element 50 according to FIG. 6 has a different function than the first diffractive alignment structure 76 according to FIG. 5, and the first wave shaping element 48 according to FIG. 6 comprises two diffractive alignment structures 178 and 84 acting as Littrow gratings. The diffractive alignment structure 84 is, as in the embodiment according to FIG. 5, used for adjusting the tilt angle of the first wave shaping element 48 with respect to the optical axis 32.

The first diffractive alignment structure 176 transforms a portion of the incoming light 46 into a converging spherical auxiliary wave 180 having its focus between the first diffractive alignment structure 176 of the second wave shaping element 50 and the diffractive alignment structure 178 of the first wave shaping element 48. The light of the auxiliary wave 180 reflected back by the diffractive alignment structure 178 acting as a Littrow grating interferes with the reference light 40 on the photosensitive surface 56 of the camera chip 58.

The resulting interferogram is indicative of the distance between the wave shaping elements 48 and 50 with respect to the surface normal of element 50 as well as a decentration of the wave shaping elements 48 and 50 relative to each other in a direction perpendicular to the surface normal of element 48. Therefore, according to the embodiment shown in FIG. 6 the distance between the wave shaping elements 48 and 50, their relative decentration and their tilt angle with respect to each other can be determined and appropriately adjusted during the alignment process. Further, the Littrow structures 82 and 84 are used to determine the tilt with respect to the optical axis 32.

Figure 6:
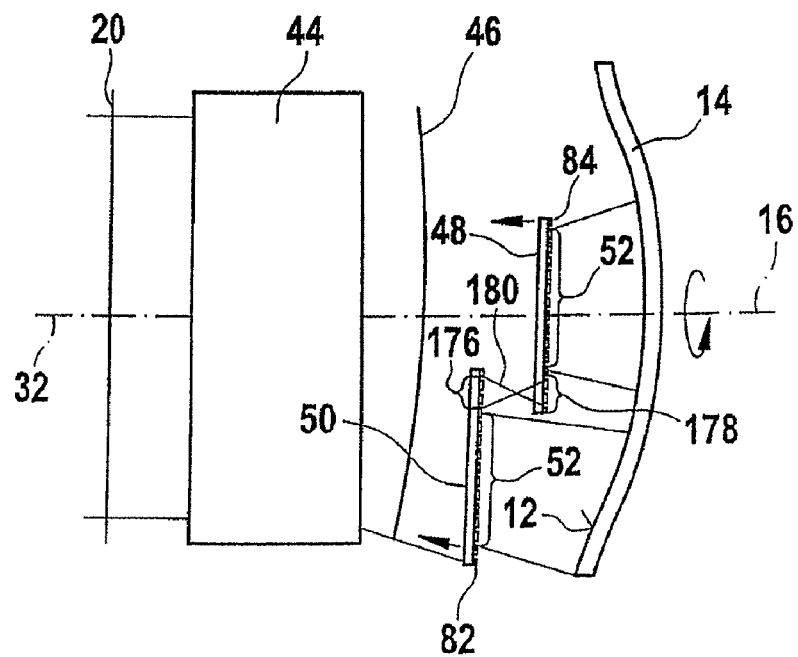
FIG. 6 illustrates the portion of the measuring apparatus illustrated in FIG. 5 including a set of two wave shaping elements in a second embodiment according to the invention.
Figure 7:
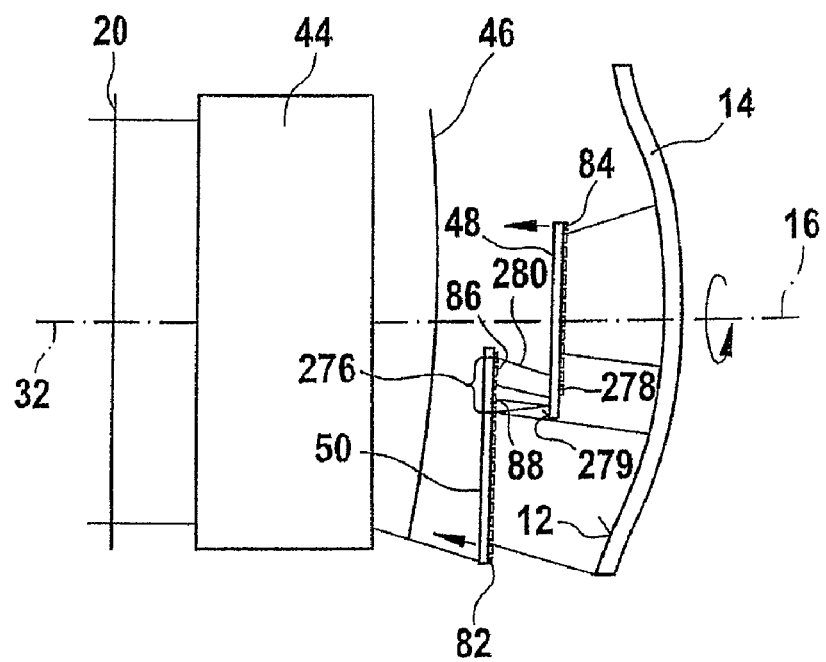
FIG. 7 illustrates the portion of the measuring apparatus illustrated in FIG. 5 including a set of two wave shaping elements in a third embodiment according to the invention.

The embodiment according to FIG. 7 differs from the embodiment according to FIG. 6 in that the second wave shaping element 50 comprises a first diffractive alignment structure 276 which differs from the first diffractive alignment structure 176 according to FIG. 6 in that it contains partial alignment structures 86 and 88.

Further, the first wave shaping element 48 is provided with a first diffractive alignment structure 278 located next to a reflective surface 279. The first partial alignment structure 86 generates an auxiliary wave 280 from the incoming light 46, which auxiliary wave 280 has a propagation direction tilted with respect to the optical axis 32. The auxiliary wave 280 is reflected by the first diffractive alignment structure 278 acting as a Littrow grating.

The reflected light interferes with the reference light 40 on the photosensitive surface 56 of the camera chip. The resulting interferogram is indicative of the lateral position of the two wave shaping elements 48 and 50 relative to each other with respect to the surface normal. The second partial alignment structure 88 focuses the incoming light 46 onto the reflective surface 279 and allows analogously to the first diffractive alignment structure 76 according to FIG. 5 the measurement of the distance between the two wave shaping elements 48 and 50. According to the embodiment shown in FIG. 7, the axial and lateral distance of the wave shaping elements 48 and 50 relative to each other as well as the tilt angles of the wave shaping elements 48 and 50 with respect to each other can be measured in correspondence to FIG. 6.

Figure 8:
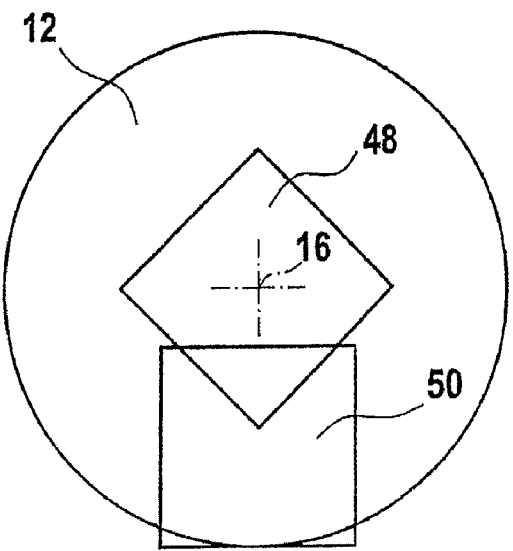
FIG. 8 is a plan view of the wave shaping elements shown in FIGS. 5, 6 and 7.

FIG. 8 shows the positioning of the wave shaping elements 48 and 50 with respect to the optical surface 12 to be measured in a view along axis 16. In order to measure the entire optical surface 12, the test object 14 is rotated around the rotational axis 16 and measurements are performed at various rotational positions. The measurement results for the different rotational positions are subsequently mathematically stitched, as explained later, to obtain a measurement result of a deviation distribution of the entire optical surface from its target shape.

Figure 9:
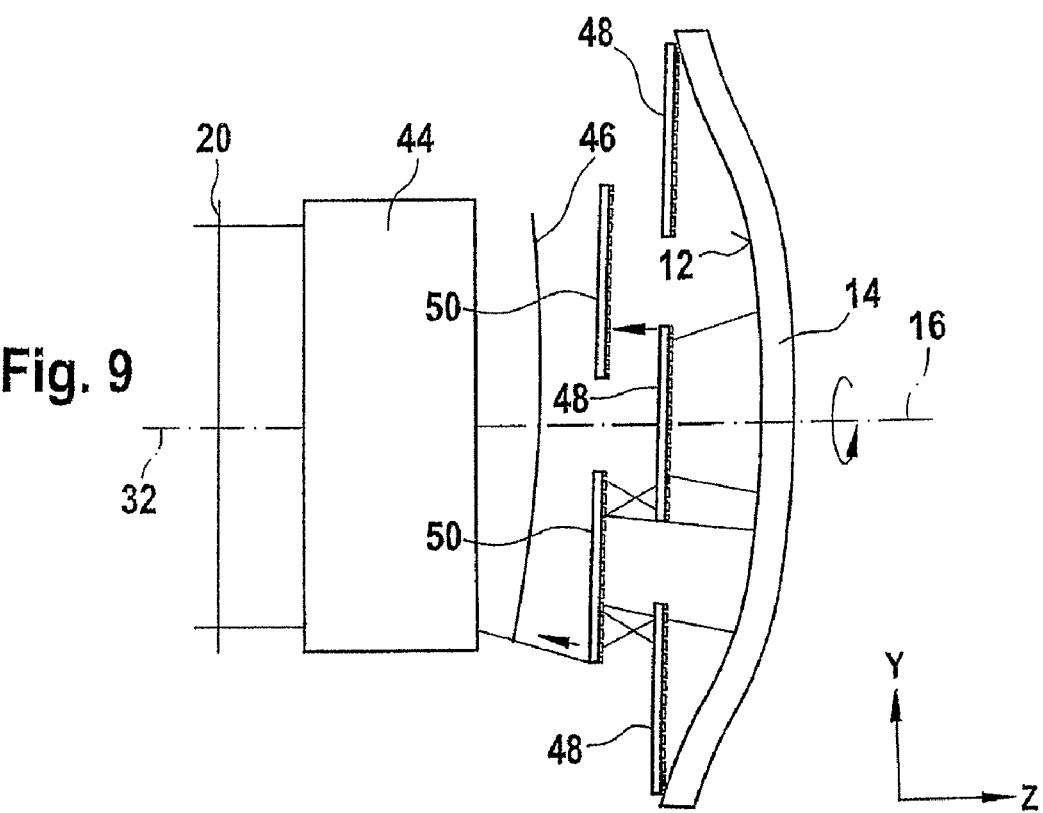
FIG. 9 illustrates the portion of the measuring system shown in FIG. 6 including a set of five wave shaping elements in an arrangement according to the invention.
Figure 10:
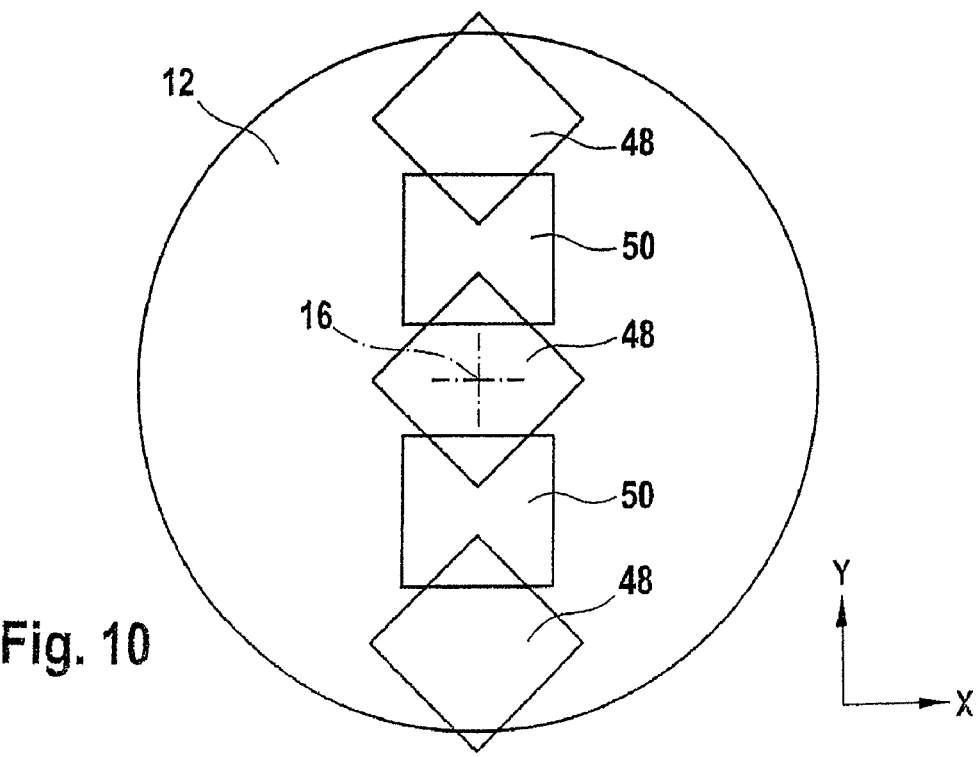
FIG. 10 is a plan view of the wave shaping elements shown in FIG. 9.
Figure 11:
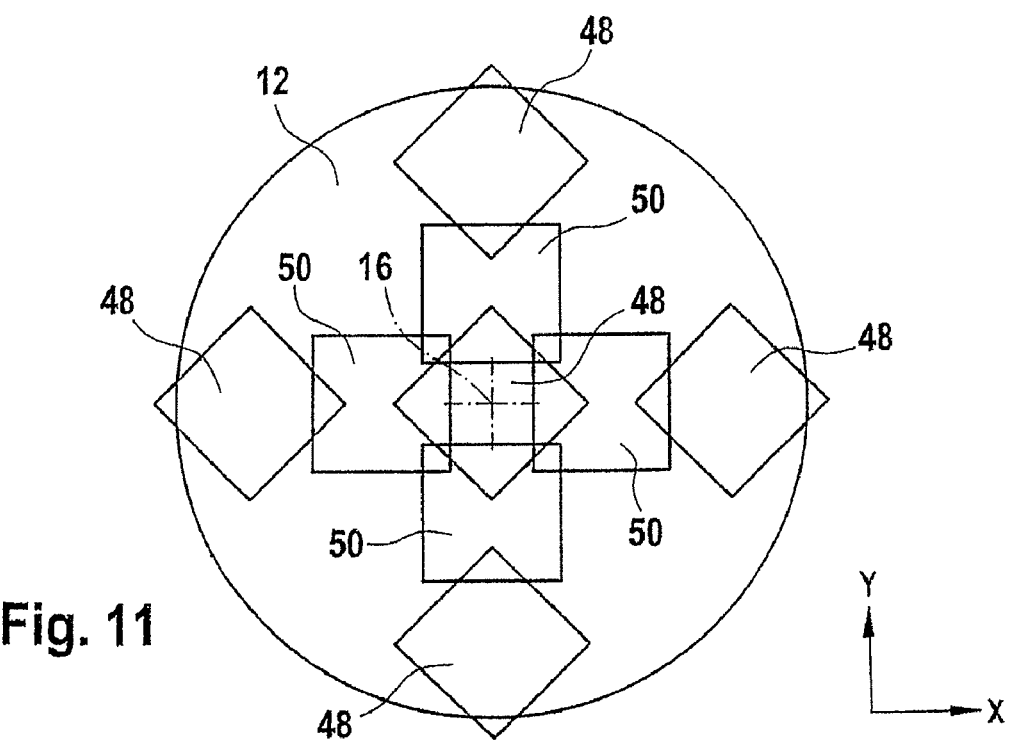
FIG. 11 is a plan view of a set of nine wave shaping elements in an arrangement according to the invention.

FIGS. 9 and 10 illustrate a further embodiment of the measuring apparatus 10 according to the invention. The measuring apparatus 10 according to this embodiment differs from the embodiment shown in FIG. 1 in that it comprises a larger number of wave shaping elements 48 and 50. Specifically, three first wave shaping elements 48 are arranged in a first common plane. Two second wave shaping elements 50 are arranged in a second common plane such that the second wave shaping elements 50 cover gaps between the first wave shaping elements 48. The alignment between wave shaping elements 48 and 50 can be achieved according to any of the variations shown in FIGS. 5 to 7. In the embodiment according to FIGS. 9 and 10 the wave shaping elements 48 and 50 are arranged along an axis perpendicular to the optical axis 32 (z-axis). FIG. 11 illustrates a further embodiment of the invention, in which the wave shaping elements 48 and 50 are arranged in two directions perpendicular to the optical axis 32 (x- and y-axes). For an optical surface 12 being rotationally symmetric about the rotational axis 16 the entire optical surface 12 can be measured by the embodiments of the measuring apparatus illustrated in FIGS. 5 to 11. For this purpose respective portions of the optical surface 12 are measured at different rotational positions of the optical surface 12 and thereafter the measurement results are stitched together mathematically.

Figure 12:
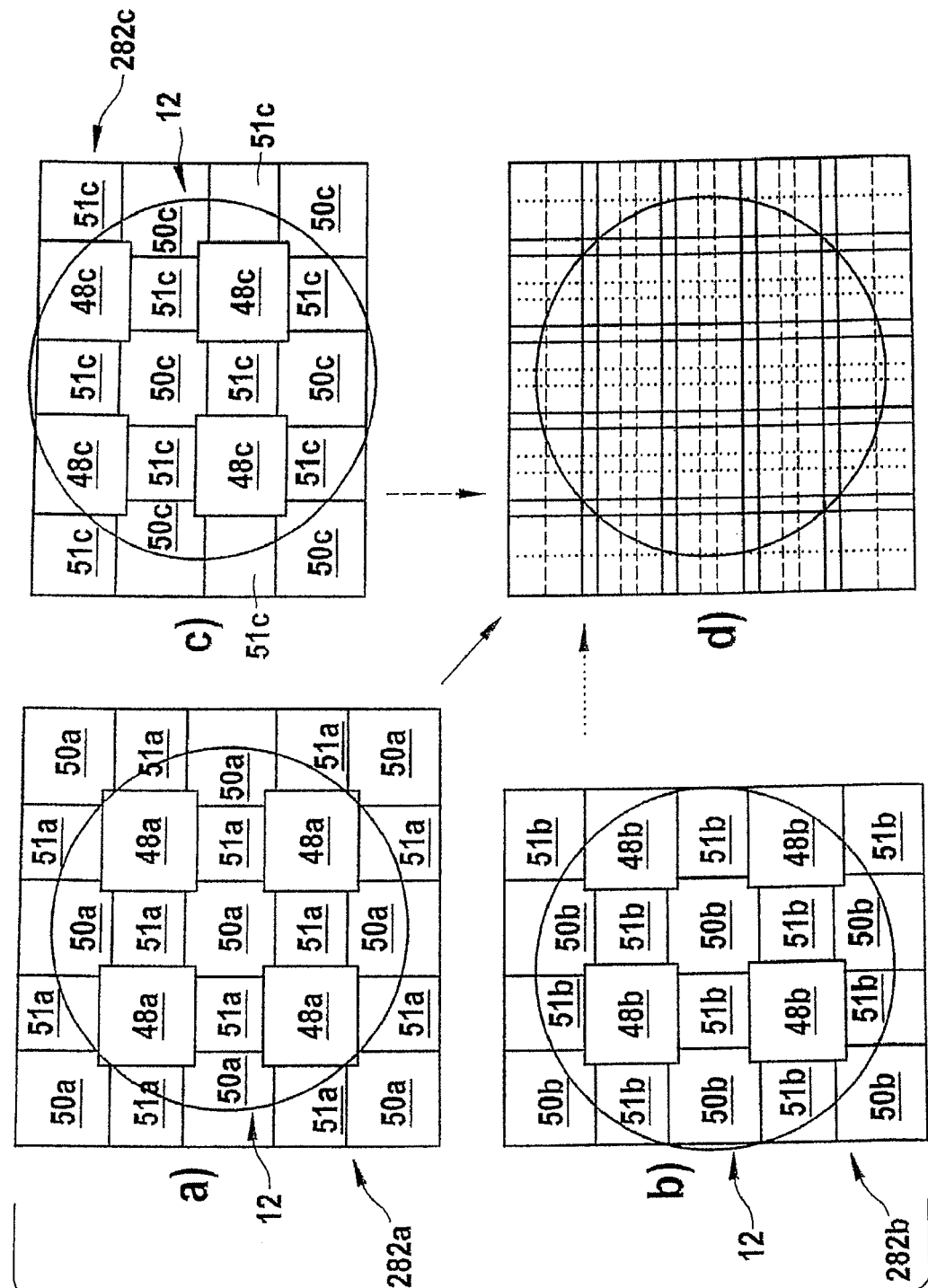
FIG. 12 illustrates a method, according to the invention, of obtaining measurements by means of three sets of wave shaping elements and stitching the measurement results.

FIG. 12 shows a further embodiment of the invention, according to which a rotationally non symmetric optical surface 12, that means a so called free form surface, can be measured. According to this embodiment respective portions of the optical surface 12 are consecutively measured using three different sets of wave shaping elements. In a first measurement step, a measurement is made using a first set of wave shaping elements 282a. Set 282a comprises four first wave shaping elements 48a arranged in a spaced even arrangement in a first plane. Second wave shaping elements 50a are arranged in a second plane such that they overlap somewhat with the first wave shaping elements 48a in projection along the optical axis 32 in order to allow alignment between the wave shaping elements 48a and 50a according to the invention. Further, third wave shaping elements 51a are arranged in a third plane such that they overlap somewhat with the first wave shaping elements 48a and the second wave shaping elements 50a in projection along the optical axis 32 in order to allow alignment of the wave shaping elements 51a to the wave shaping elements 50a and/or the wave shaping elements 48a. The wave shaping elements 48a, 50a and 51a comprise respective diffractive measurement structures 52, each being correspondingly adapted to the target shape of the optical surface 12 in a respective area.

Further, a second set 282b of wave shaping elements and a third set 282c of wave shaping elements are provided each having the same basic arrangement structure as the first set 282a. The respective overall arrangements of the sets 282a, 282b and 282c are, however, shifted relative to each other in a plane perpendicular to the optical axis 32. Different areas of the optical surface 12 are covered by the respective diffractive measurement structures 52, such that the entire optical surface 12 is covered by the diffractive measurement structures 52 of all three sets 282a, 282b and 282c. The respective diffractive measurement structures are individually adapted to the respective portions of the optical surface 12 covered by the same. The measurement results obtained by the three sets 282a, 282b and 282c are stitched together using mathematical stitching methods. In the embodiment of FIG. 12 the three sets of wave shaping elements 282a, 282b and 282c are replaced by each other for the different measurements. In a further embodiment the different measurements are conducted by three different interferometric measuring apparatuses 10. Therefore the different measurements can be conducted using an incoming light beam 46 from a single interferometer or from respective illumination beams of separate interferometers.

Figure 13:
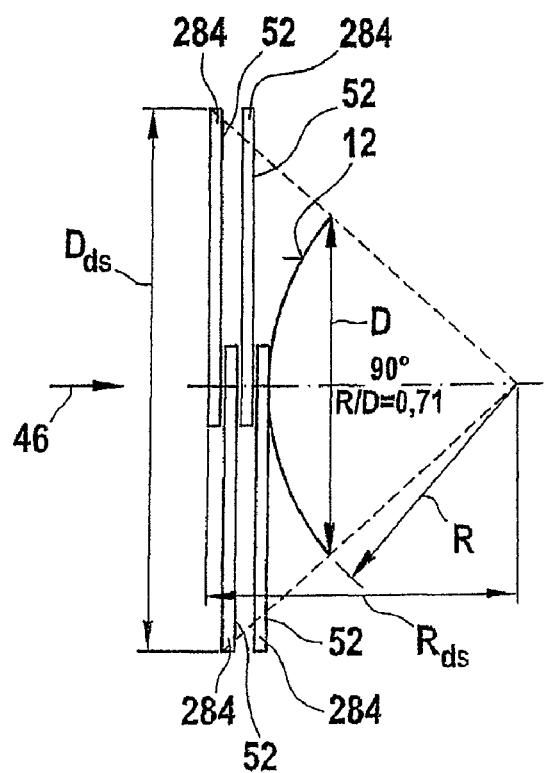
FIG. 13 illustrates an arrangement of four wave shaping elements with respect to an optical surface to be measured in an embodiment according to the invention.
Figure 14:
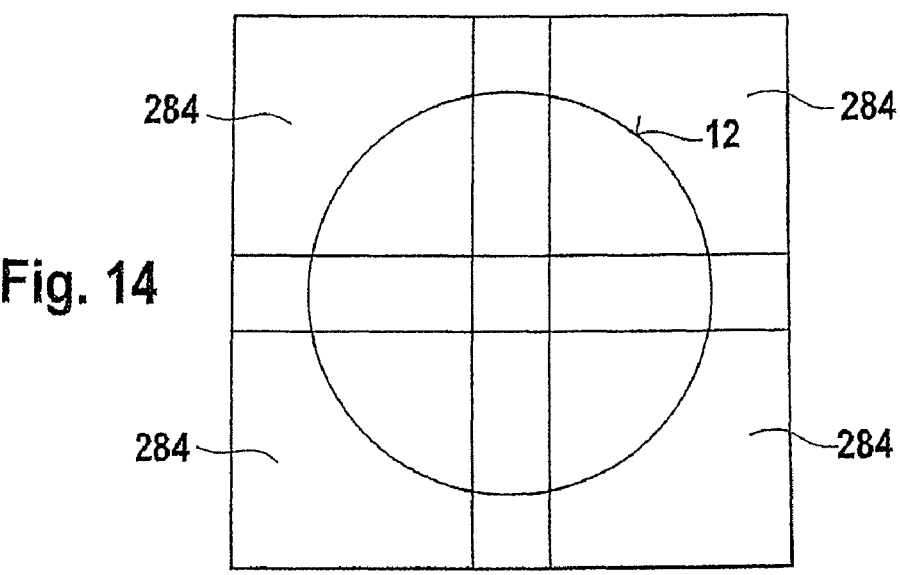
FIG. 14 is a plan view of the wave shaping elements shown in FIG. 13.

FIGS. 13 and 14 show a further embodiment of an arrangement of wave shaping elements 284 together with an optical surface 12 to be measured. In this embodiment four wave shaping elements 284 are arranged next to each other in an overlapping manner, such that each of the four quadrants of the optical surface 12 is covered by a respective wave shaping element 284. In case of the optical surface 12 to be measured being convex, as displayed in FIG. 13, the required size of the wave shaping elements 284 is determined by the diameter D as well as the radius of curvature R of the optical surface 12. Given a constant diameter $D_{ds}$ covered by the diffractive measurement structures 52 of the wave shaping elements 284, the maximum diameter D of the optical surface 12 testable is defined by:

$$D = 2R \cdot \sin\left\{\arctan\frac{D_{ds}}{2R_{ds}}\right\}, \quad (5)$$

wherein $R_{ds}$ is the maximum distance between the wave shaping elements 284 and the center of curvature of the optical surface 12.

Figure 26:
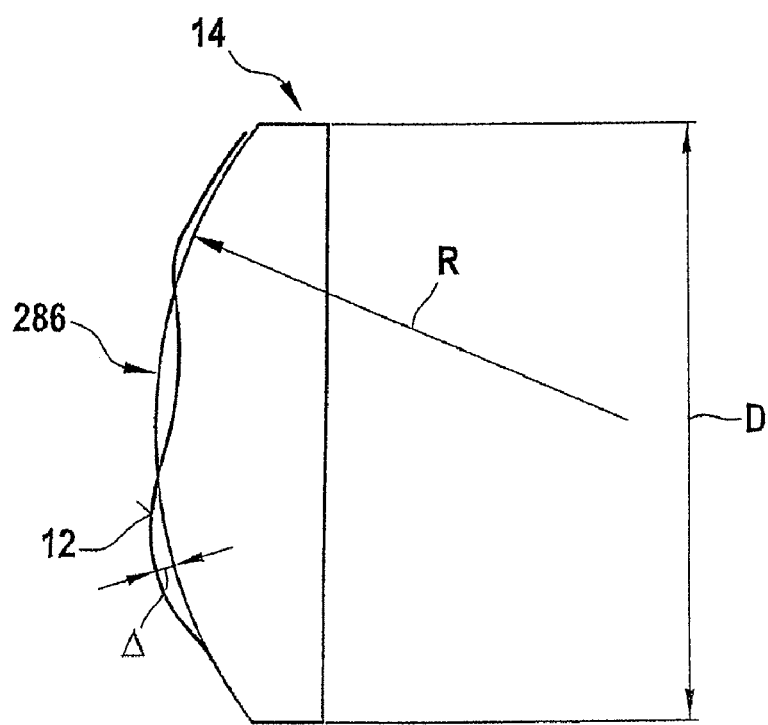
FIG. 26 illustrates the shape of an optical surface of an asphere.
Figure 27:
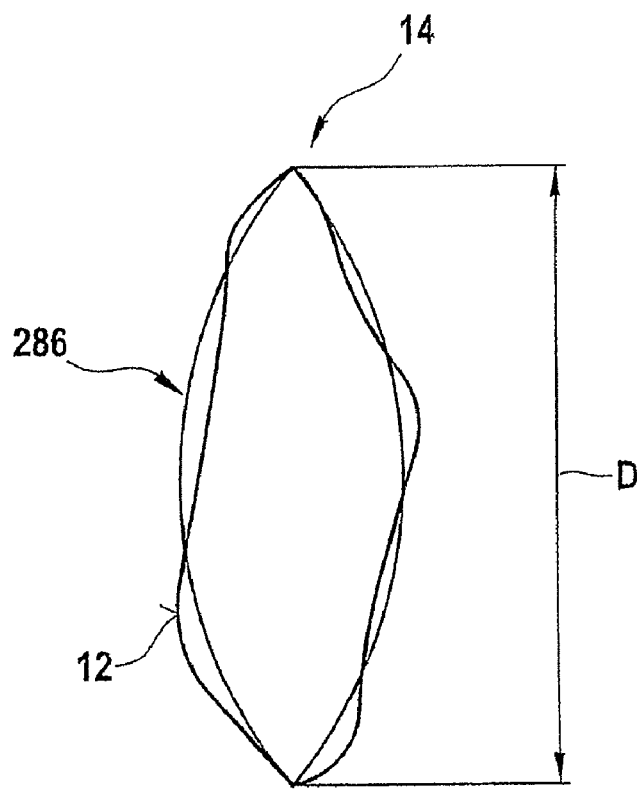
FIG. 27 illustrates the shape of an optical surface of a double-asphere.

The maximum diameter of a single CGH acting as the diffractive measurement structure 52 currently available in appropriate quality is smaller than 300 mm. The optical surface 12 shown in FIG. 13 is aspherical in shape, that means it departs slightly from a spherical shape. This is schematically illustrated in FIG. 26. Therein, a best fitting sphere 286 of the optical surface 12 is shown. The best fitting sphere 286 has the radius of curvature R and the diameter D. The actual optical surface of the test object 14 deviates from the best fitting sphere 286 by a maximum of Δ. The proportion of the deviation Δ with respect to the radius of curvature and the diameter D is exaggerated in FIG. 26 for illustrative purposes. FIG. 27 shows a test object 14 in the form of a double-asphere.

Figure 15:
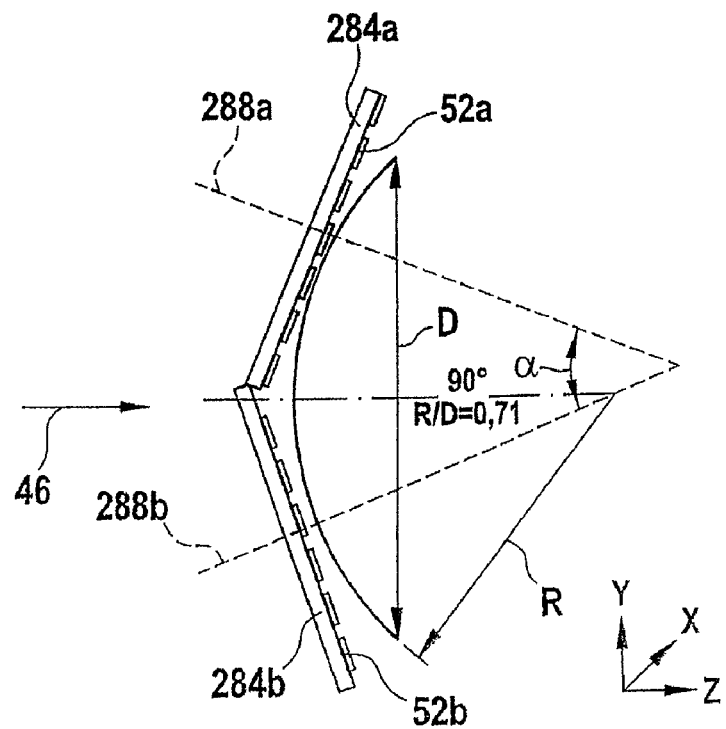
FIG. 15 illustrates an arrangement of two wave shaping elements according to an embodiment of the invention.
Figure 16:
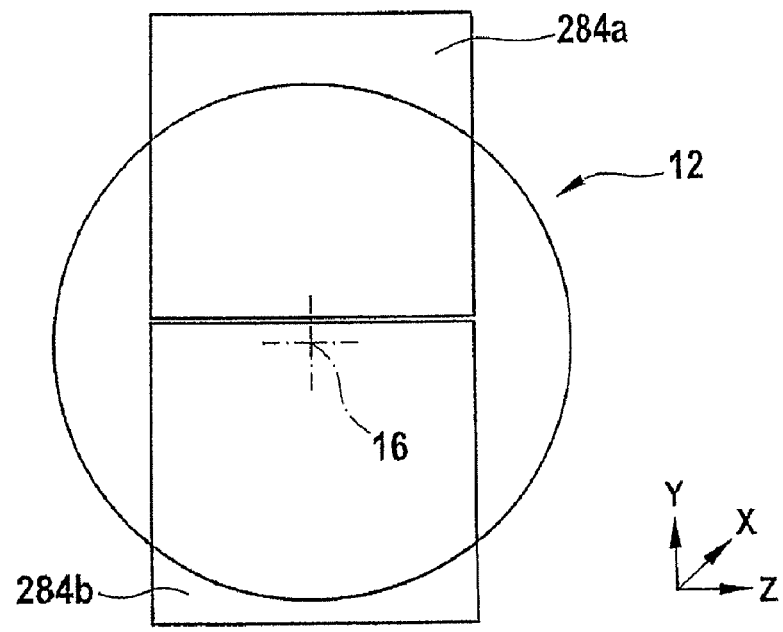
FIG. 16 is a plan view of the wave shaping elements shown in FIG. 15.

FIGS. 15 and 16 show a further embodiment of an arrangement of two wave shaping elements 284a and 284b according to the invention. Each of the wave shaping elements 284a and 284b comprises a respective diffractive measurement structure 52a and 52b. Each of the diffractive measurement structures 52a and 52b has a respective surface normal 288a and 288b. The wave shaping elements 284a and 284b are tilted relative to each other such that the respective surface normals 288a and 288b are also tilted relative to each other by a tilt angle α.

In the shown example, the tilt angle α is around 15°. Therefore, the diffractive measurement structures 52a and 52b form a "roof"-shaped structure into which the optical surface 12 is partly inserted. This way the diffractive measurement structures 52a and 52b follow in a first approximation the shape of the optical surface 12 which allows an optical surface 12 having a larger diameter D to be measured as compared to the embodiment according to FIG. 13 using diffractive measurement structures of the same size.

FIG. 16 is a plan view of the wave shaping elements 284a and 284b of FIG. 15 viewed in a direction of the incoming light 46. As is apparent from FIG. 16 the wave shaping element 284b covers the central area of the optical surface 12 containing the rotational axis 16. For measuring the entire optical surface 12 the optical surface 12 is rotated and measurements are taken at several rotational positions. According to one embodiment the wave shaping elements 284a and 284b are aligned relative to each other using the alignment structures illustrated in FIGS. 5 to 7.

Figure 17:
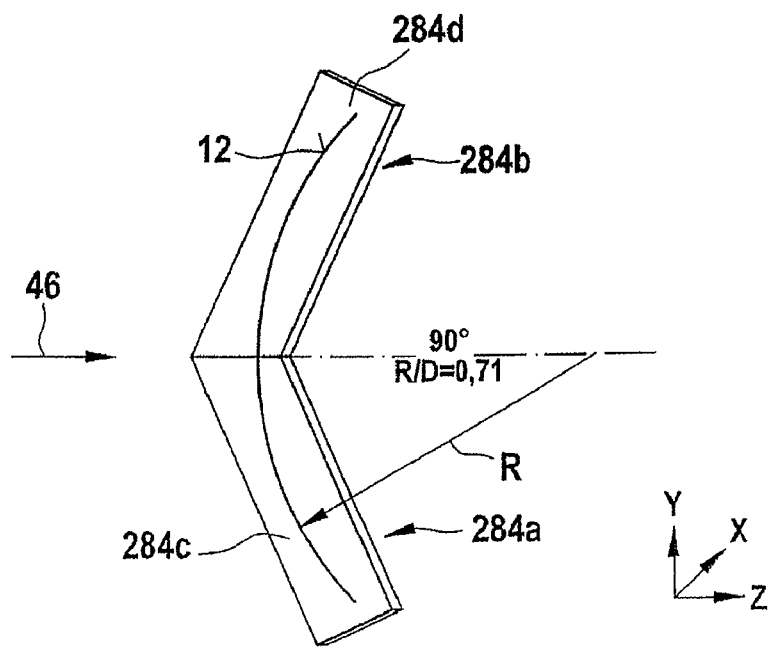
FIG. 17 illustrates an arrangement of four wave shaping elements in a further embodiment according to the invention.
Figure 18:
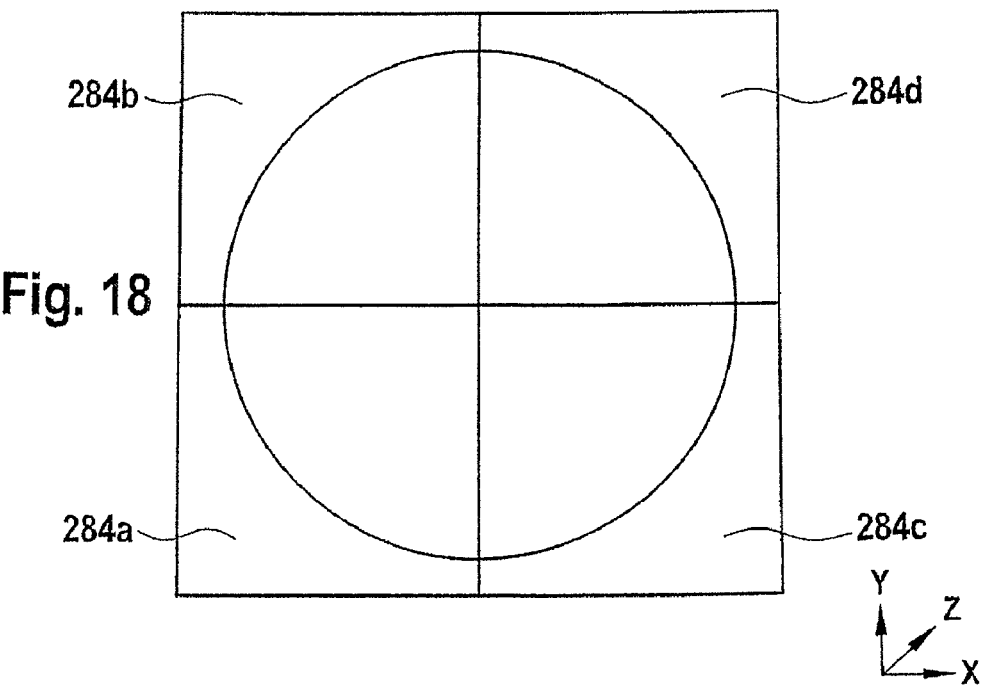
FIG. 18 is a plan view of the wave shaping elements shown in FIG. 17.

FIGS. 17 and 18 show an arrangement of four wave shaping elements 284a, 284b, 284c and 284d in an embodiment according to the invention, which allows the measurement of a free form optical surface 12. According to this embodiment the wave shaping elements 284a, 284b, 284c and 284d are arranged to form a four sided roof. That means, the wave shaping elements 284a, 284b, 284c and 284d are arranged next to each other in order to cover all four quadrants of the optical surface 12, wherein the respective wave shaping elements are each tilted relative to their neighbouring wave shaping elements.

Figure 19:
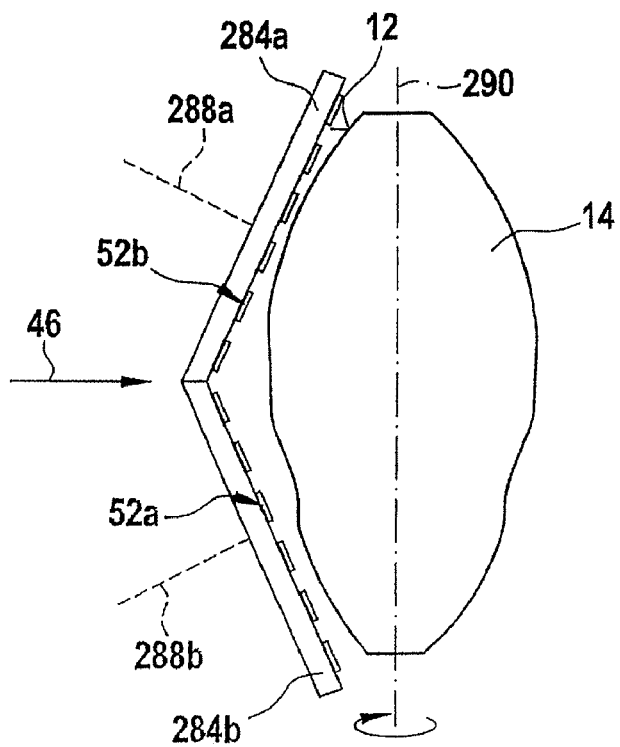
FIG. 19 illustrates an arrangement of two wave shaping elements with respect to a test object in a further embodiment according to the invention.
Figure 20:
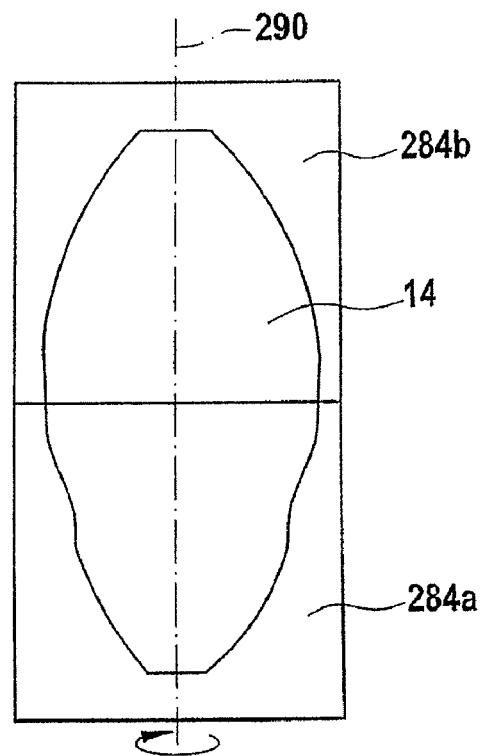
FIG. 20 is a plan view of the wave shaping elements shown in FIG. 19.

FIGS. 19 and 20 illustrate a further embodiment of the wave shaping elements 284a and 284b. According to this embodiment the wave shaping elements 284a and 284b are adapted for measuring a test object 14, which is rotationally symmetric with regards to a rotational axis 290. The rotational axis 290 is arranged perpendicular to the propagation direction of the incoming light 46. During measurement the test object 14 is measured in different rotational positions around the rotational axis 290 and the measurement results are stitched together mathematically.

Figure 21:
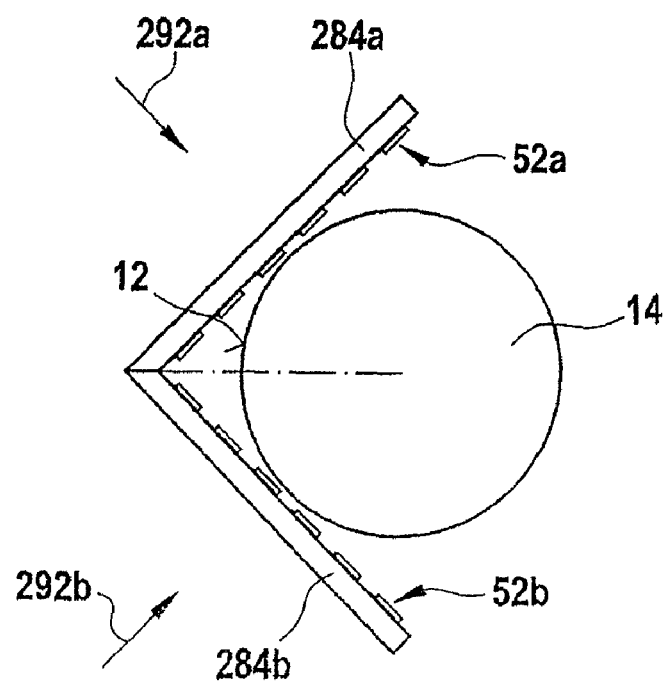
FIG. 21 illustrates an arrangement of two wave shaping elements in a further embodiment according to the invention.
Figure 22A:
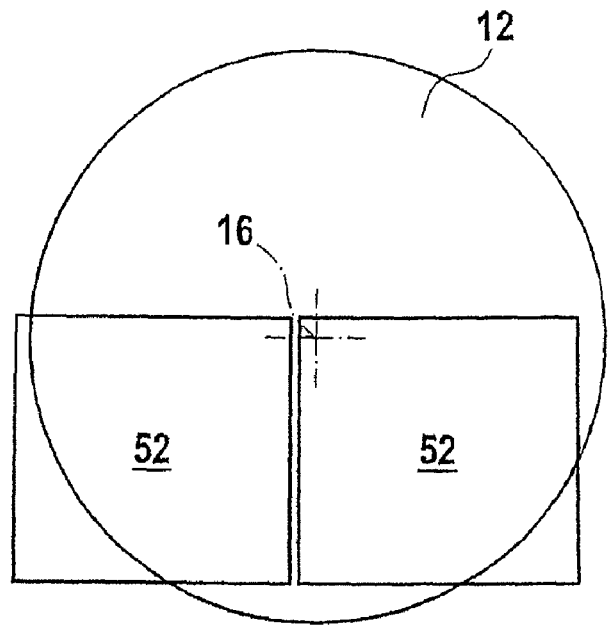
FIGS. 22a to 22d are plan views of different arrangements of diffractive measurement structures in further embodiments according to the invention.
Figure 22B:
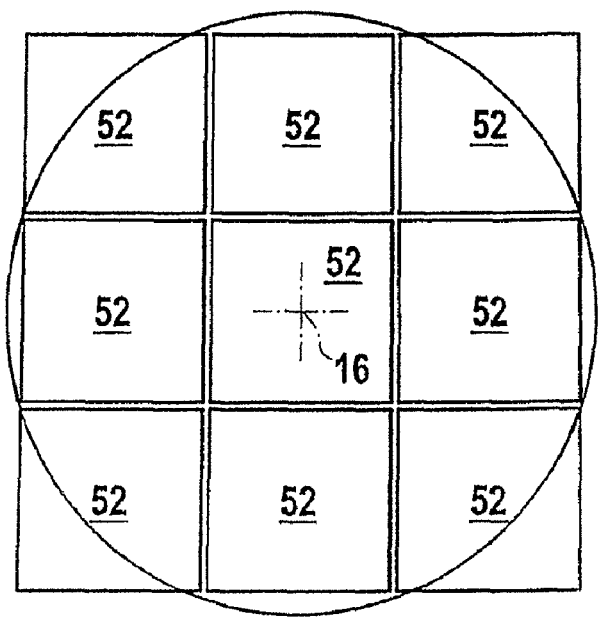
Figure 22C:
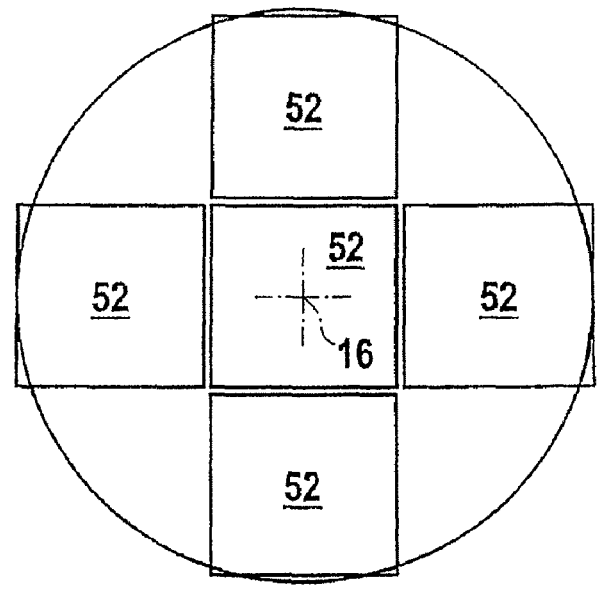
Figure 22D:
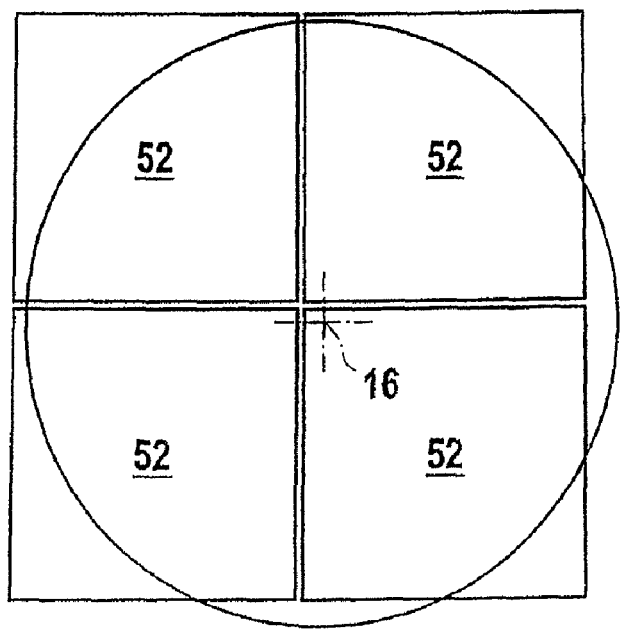

FIG. 21 illustrates a further embodiment of a measuring apparatus according to the invention, in which the incoming light 46 comprises two incoming light beams 292a and 292b, each of which is nearly perpendicular to a respective wave shaping element 284a and 284b arranged in a tilted fashion. The separate incoming light beams 292a and 292b can originate from a single interferometer or from the respective illumination beams of separate interferometers. According to this embodiment a larger surface area of the optical surface 12 can be measured.

FIGS. 22a to 22d show different arrangements of diffractive measurement structures 52 suitable for performing a further embodiment of the measuring method according to the invention, which measuring method includes a stitching algorithm for adjusting misalignments between single diffractive measurement structures 52. According to this measuring method an optical surface being rotationally symmetric with respect to a rotational axis 16 is rotated into different rotational positions and the wave front of the respective measuring light 54 is measured accordingly. In the arrangements according to FIGS. 22b and 22c a central diffractive measurement structure is provided in the centre of the optical surface 12. In the arrangements according to FIGS. 22a and 22d the diffractive measurement structures are arranged such that the area of the rotational axis 16 on the optical surface 12 is covered by an outer area of one of the diffractive measurement structures 52.

In an embodiment of the measuring method according to the invention, the diffractive measurement structure 52 covering the rotational axis 16 is first roughly aligned, for example by means of an optical coherence tomography (OCT) distance measuring system, a Littrow grating and/or an autocollimator. Subsequently, the test object 14 is inserted into the measuring apparatus 10 and the test object 14 and the central diffractive measurement structure 52 are alternately aligned. Subsequently, the remaining diffractive measurement structures 52 which do not cover the rotational axis 16 are roughly aligned, either optically or by means of CGH-alignment structures. This rough alignment has the purpose of minimising the wave front error of the measuring light 54 such that a continuous wave front within the single measurement structures 52 can be measured from the light originating from each diffractive measurement structure 52.

The embodiment of the measurement method according to the invention further comprises the step of arranging the optical surface 12 in a first rotational position, and illuminating a first area of the optical surface 12 with the incoming light 46 having traversed the respective diffractive measurement structures 52 whereby a first measuring light having interacted with the first area is generated.

Subsequently, the wave front of the first measuring light is determined interferometrically by superimposing the first measuring light with the reference light 40. Afterwards the test object 14 is rotated into a second rotational position and a second area of the optical surface, which partially overlaps with the first area, is illuminated with the incoming light having traversed the diffractive measurement structures 52 and thereby first measuring light having interacted with the second area is generated. Thereafter, the wave front of the second measuring light is determined interferometrically. The above steps are, if necessary optionally repeated with the test object 14 being arranged in further rotational positions. The number of rotational positions has to be chosen so that the complete optical surface can be stitched from the measured wave fronts.

Further, sensitivity distributions $(B_{kl})_{x,y,rotn}$ for each diffractive measurement structure 52 are determined, which sensitivity distributions $(B_{kl})_{x,y,rotn}$ describe the influence of a given misalignment of a respective diffractive measurement structure k in a respective degree of freedom l on a wave front related to a given rotational position rotn of the optical surface 12. The influence on the wave front is described as a function of the coordinates x and y orthogonal to the propagation direction of the measuring light 54 or the optical axis 32. In other words, the sensitivity distribution $(B_{kl})_{x,y,rotn}$ describes an effect to the wave front of the measuring light 54 caused by an alteration of the position of the respective diffractive measurement structure 52 in a given degree of freedom l. The degrees of freedom l for a single diffractive measurement structure 52 include tilt x, tilt y, decentration x, decentration y, azimuthal angle and distance z.

Figure 23:
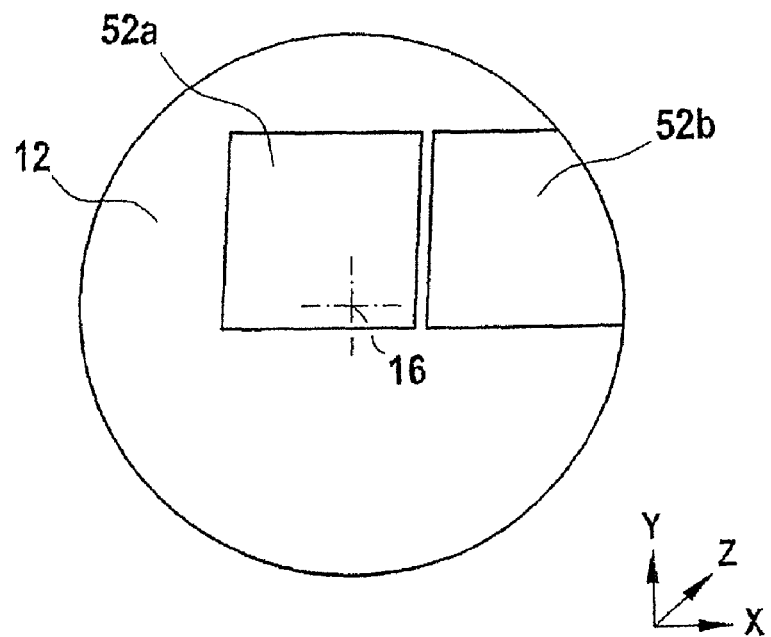
FIG. 23 is a plan view of two diffractive measurement structures in an arrangement according to an embodiment of the invention.

FIG. 24a shows an example of a sensitivity distribution $(B_{11})_{x,y}$ for a first diffractive measurement structure 52a according to FIG. 23 in a second rotational position, in which the optical surface 12 is rotated form a first rotational position shown in FIG. 23 clockwise by 60°. This sensitivity distribution shows the effect of a variation of the distance z between the diffractive measurement structure 52a and the neighboring diffractive measurement structure 52b on the wave front distribution of the measuring light 54. FIG. 25b shows the sensitivity distribution $(B_{12})_{x,y}$ describing the effect of varying the position of the diffractive measurement structure 52a along the x-axis. FIGS. 24c and 24d depict the sensitivity distributions $(B_{11})_{x,y}$ and $(B_{12})_{x,y}$ with the optical surface 12 being rotated back to the first rotational position of the optical surface 12 shown in FIG. 23. In analogy to FIGS. 24a to 24d, FIGS. 25a to 25d show sensitivity distributions of a second diffractive measurement structure 25b according to FIG. 23.

According to the inventive method misalignment coefficients in the form of fitting coefficients $a_{mj}$ and $b_{kl}$ are determined by minimizing the following term:

$$\sum_{m=1}^{AD} \sum_{n=1}^{AD, n \neq m} \left[ \sum_{x,y} \left\{ \left( W_{mx,y} - \sum_{k=1}^{ACGHs} \sum_{l=1}^{Af} b_{kl} \cdot (B_{kl})_{x,y,rotm} \right) - \\ \left( W_{nx,y} - \sum_{k=1}^{ACGHs} \sum_{l=1}^{Af} b_{kl} \cdot (B_{kl})_{x,y,rotn} \right) - \\ \sum_{j=1}^{AJ} [a_{mj} - a_{nj}] \cdot A_{j x,y} \right\}^2 \right] = \min, \quad (6)$$

wherein:

ACGHs is the number of single diffractive measurement structures 52 in form of CGHs;

Af is the number of degrees of freedom in alignment of the single diffractive measurement structures 52 (usually six degrees of freedom: tilt x, tilt y, decentration x, decentration y, azimuth angle and distance z);

$(B_{kl})_{x,y,rotm}$ is the distribution for a degree of freedom l of the k-th diffractive measurement structure rotated back to the angle of the m-th rotational position at the surface coordinate x, y. The rotation also includes a distortion correction.

$b_{kl}$ is the fitting coefficient of the sensitivity distribution of the l-th degree of freedom of the k-th diffractive measurement structure;

AD is the number of rotational positions;

$W_{m\,x,y}$ is the wave front in the m-th rotational position, rotated back to the angle of the m-th rotational position at the surface coordinate x,y;

AJ is the number of degrees of freedom in alignment of the optical surface 12 (usually five degrees of freedom: tilt x, tilt y, decentration x, decentration y and distance z with respect to measuring apparatus 12).

$A_{j\,x,y}$ is the sensitivity distribution for a degree of freedom j of the optical surface 12 at the surface coordinate x,y;

$a_{ij}$ is the fitting coefficient of the sensitivity distribution for the j-th degree of freedom of the optical surface 12 for the i-th rotational position;

The sensitivity distribution $A_{j\,x,y}$ describes the influence of a given misalignment of the optical surface 12 in a respective degree of freedom j on the wave front of the measuring light 54 as a function of the coordinates x and y, and $a_{mj}$ and $a_{nj}$ are misalignment coefficients in the form of fitting coefficients of the optical surface 12 for respective rotational positions m and n.

The fitting coefficients $a_{mj}$ and $b_{kl}$ are determined from the above least square approach by determining the derivative of equation (6) with respect to the single coefficients $a_{mj}$ and $b_{kl}$ and determining the solution of the linear system of equations resulting therefrom. For determining the wave front $W_m$ interferometer errors should be considered after the measurement (depending on the arrangement, for example, wave front errors through the Fizeau surface 38, a prism and above all the effect of the single diffractive measurement structures (disturbance data), which are determined during qualification of the diffractive measurement structures 52).

The determined fitting coefficients $a_{mj}$ and $b_{kl}$ are combined with the measured wave fronts $W_m$ and an overall deviation distribution of the optical surface 12 from the target shape is determined therefrom.

Referring to FIG. 26 an optical element in the form of an asphere 14 is provided according to the invention. The asphere 14 has an aspherical optical surface 12 extending over a diameter D of the asphere. According to a first embodiment a best fitting spherical surface 286 of the aspherical optical surface 12 has a radius of curvature R, and the parameters D and R are related as follows:

$$D > 2R \cdot \sin\left(\arctan\frac{500 \text{ mm}}{2R}\right) \quad (7)$$

According to a second embodiment of the asphere a best fitting spherical surface of the aspherical optical surface has a radius of curvature R of at least 130 mm, and the ratio D/R is larger than 1.3. In further variations the ratio D/R is larger than 1.5, especially larger than 2.0.

The manufacture of such such an asphere either according to the first embodiment or the second embodiment is made possible by the manufacturing method according to the invention as explained above in more detail.

The asphere 14 according to the first or the second embodiment can be configured as a lens or a mirror, especially for use in a projection exposure tool for microlithography. In an embodiment the asphere 14 is configured as a mirror used in a projection objective of a projection exposure tool for microlithography operating with extreme ultraviolet light (EUV), e.g. light having a wavelength of 13.4 nm. Embodiments of such a projection objective are presented below in detail.

The best fitting aspherical optical surface 12 can be convex or concave. In one variation the diameter D is larger than 500 mm. In a further variation the optical surface 12 is rotationally non-symmetric and diameter D is larger than 300 mm. The optical surface can have a deviation from said best fitting spherical surface of at least 50 μm, in particular at least 100 μm or at least 200 μm. The actual shape of said optical surface deviates from a target shape of the optical surface by a maximum of 5 μm.

Figure 28:
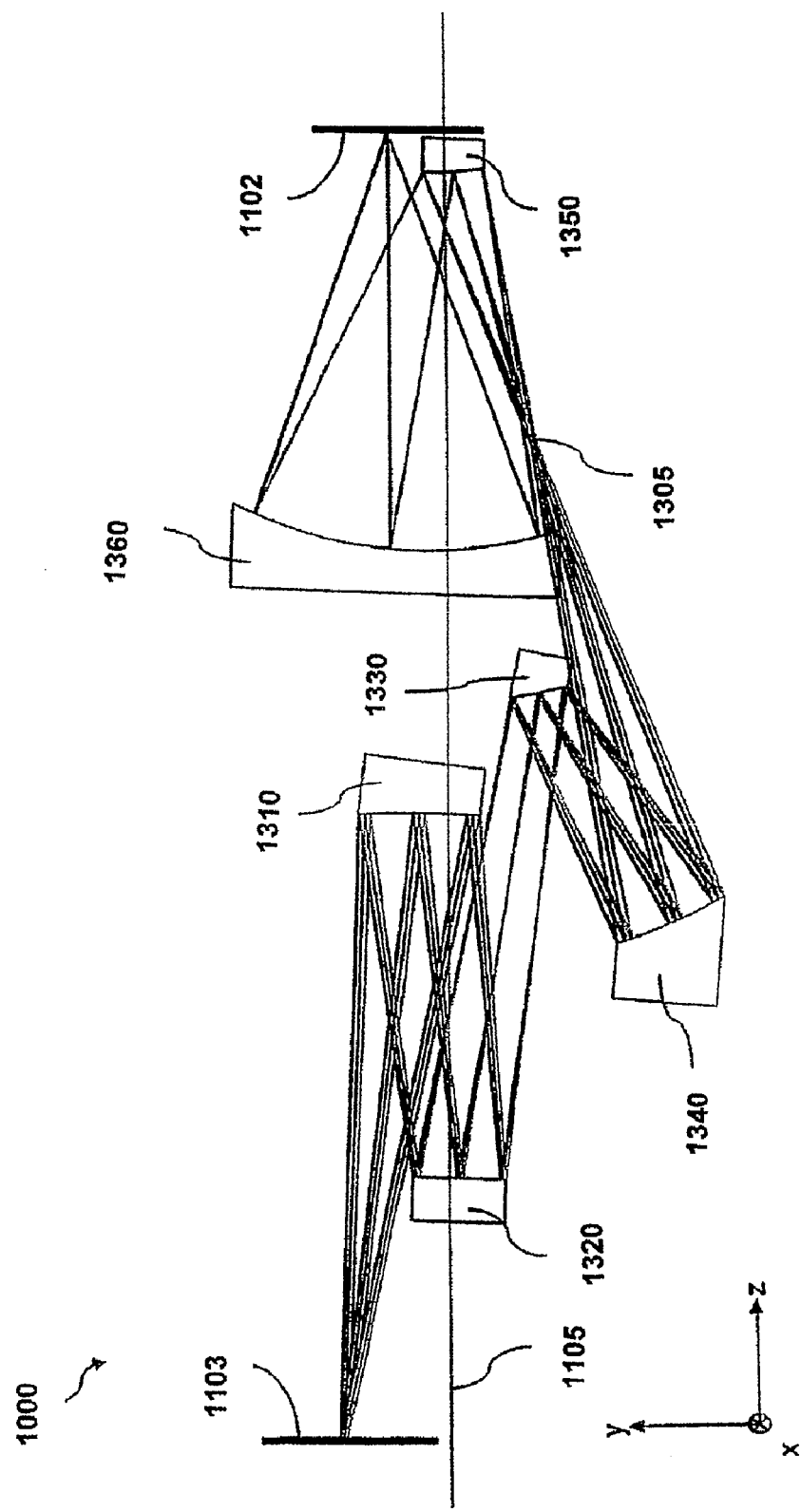
FIG. 28 shows a first embodiment of a projection objective including at least one optical element in form of an asphere according to the invention.

FIG. 28 shows a first exemplary embodiment 1000 of a projection objective for a projection exposure tool operating with EUV-radiation. The projection objective 1000 according to FIG. 28 includes six rotationally-asymmetric mirrors 1310, 1320, 1330, 1340, 1350, and 1360. An asphere of the above described type according to the invention is used as at least one of these mirrors, which is manufactured, e.g. using the manufacturing method according to the invention. That means at least one of the mirrors is an asphere according to the invention.

The projection objective 1000 images EUV-radiation from an object plane 1103 to an image plane 1102 along a reference axis 1105. Data for the projection objective 1000 is presented Table 1A and Table 1B below. Table 1A presents optical data, while Table 1B presents rotationally-asymmetric constants for each of the mirror surfaces. For the purposes of Table 1A and Table 1B, the mirror designations correlate as follows: mirror 1 (M1) corresponds to mirror 1310; mirror 2 (M2) corresponds to mirror 1320; mirror 3 (M3) corresponds to mirror 1330; mirror 4 (M4) corresponds to mirror 1340; mirror 5 (M5) corresponds to mirror 1350; and mirror 6 (M6) corresponds to mirror 1360. "Spacing" in Table 1A refers to the distance between adjacent elements in the radiation path. The monomial coefficients $C_j$, for the rotationally-asymmetric mirrors, along with the amount the mirror is decentered and rotated from an initial projection objective design, are provided in Table 1B. R, the basic radius, is the inverse of the vertex curvature c. Decenter is given in mm and rotation is given in degrees. Units for the monomial coefficients are $mm^{-j+1}$. Nradius is a unitless scaling factor. In FIG. 28, the projection objective 1000 is shown in meridional section. The meridional plane is a symmetry plane for projection objective 1000. Symmetry about the meridional plane is as the mirrors are decentered only with respect to the y-axis and tilted about the x-axis. Further, the coefficients for the rotationally-asymmetric mirrors having an odd degree in the x-coordinate (e.g., $x, X^3, x^5$, etc.) are zero.

The projection objective 1000 is configured for operation with 13.5 nm radiation and has an image-side NA of 0.35 and a tracklength of 1,500 mm. The optical path length of imaged radiation is 3,833 mm. Accordingly, the ratio of optical path length to tracklength is approximately 2.56. The projection objective has a demagnification of 4×, a maximum distortion of less than 100 nm, $W_{rms}$ of 0.035λ, and a field curvature of 28 nm.

TABLE 1A

| Surface | Radius (mm) | Spacing (mm) | Mode |
|---|---|---|---|
| Object | INFINITY | 714.025 | |
| Mirror 1 | −1678.761 | −414.025 | REFL |
| Mirror 2 | 2754.233 | 564.025 | REFL |
| Mirror 3 | 350.451 | −316.293 | REFL |
| Mirror 4 | 590.379 | 906.948 | REFL |
| Mirror 5 | 433.060 | −435.447 | REFL |
| Mirror 6 | 521.283 | 480.767 | REFL |
| Image | INFINITY | 0.000 | |

TABLE 1B

| Coefficient | M1 | M2 | M3 | M4 | M5 | M6 |
|---|---|---|---|---|---|---|
| K | −4.724690E+00 | −9.830444E+01 | −3.914225E−01 | −8.227088E−01 | 7.162282E+00 | 9.391806E−02 |
| Y | 0.000000E+00 | 0.000000E+00 | 0.000000E+00 | 0.000000E+00 | 0.000000E+00 | 0.000000E+00 |
| $X^2$ | −1.641507E−04 | −1.736185E−04 | −2.373278E−04 | 2.451198E−05 | −1.557674E−04 | −6.667760E−06 |
| $Y^2$ | −1.752262E−04 | −1.741103E−04 | −9.708884E−04 | −3.130199E−05 | 1.398839E−04 | 9.098616E−06 |
| $X^2Y$ | −2.463783E−08 | −2.724028E−07 | 6.327587E−07 | −9.301810E−08 | 9.519017E−07 | −8.040311E−10 |
| $Y^3$ | −3.641831E−08 | −1.681535E−07 | −6.103587E−07 | 2.218271E−08 | 6.329282E−07 | −4.521618E−10 |
| $X^4$ | −1.405718E−10 | 1.314594E−09 | −1.671620E−08 | 4.569574E−10 | 7.852021E−10 | −5.450396E−11 |
| $X^2Y^2$ | −3.301633E−10 | 1.799953E−09 | 9.953323E−09 | −1.957005E−10 | 3.524719E−09 | −5.846553E−11 |
| $Y^4$ | 5.029041E−11 | 2.141266E−09 | 2.197236E−09 | 9.287687E−10 | 6.848802E−09 | −6.829886E−12 |
| $X^4Y$ | 2.090103E−13 | 4.363226E−12 | −5.435284E−11 | 1.915106E−13 | −2.016721E−11 | 5.660569E−15 |
| $X^2Y^3$ | −4.188774E−13 | 4.826497E−12 | 3.808642E−11 | −5.874603E−12 | −1.600920E−11 | −1.079542E−14 |
| $Y^5$ | −3.154238E−13 | −4.239647E−12 | −9.502949E−13 | 9.213338E−13 | 7.113886E−12 | −1.553415E−14 |
| $X^6$ | 1.150997E−16 | −5.978561E−15 | 1.819755E−13 | 1.113227E−15 | −7.841517E−34 | −1.105247E−16 |
| $X^4Y^2$ | −1.278596E−15 | −1.564797E−14 | −9.716106E−14 | 4.491475E−15 | 2.513948E−14 | −2.683146E−16 |
| $X^2Y^4$ | 4.862795E−15 | 2.347370E−14 | −8.086932E−14 | −1.357215E−14 | 7.550314E−13 | −1.006466E−16 |
| $Y^6$ | −2.281966E−15 | 6.013241E−15 | −9.790347E−15 | 9.777397E−16 | 5.013963E−13 | 2.221551E−17 |
| $X^6Y$ | 1.931804E−18 | −3.973144E−17 | 1.435292E−15 | 2.420914E−18 | 1.092143E−15 | 2.493748E−20 |
| $X^4Y^3$ | 1.873466E−17 | −2.704307E−16 | 6.491544E−16 | 1.627727E−18 | 4.414328E−15 | −3.302939E−21 |

TABLE 1B-continued

| Coefficient | M1 | M2 | M3 | M4 | M5 | M6 |
|---|---|---|---|---|---|---|
| $X^2Y^5$ | −1.108422E−17 | −6.723973E−16 | 1.496578E−17 | −1.880319E−17 | 8.552963E−15 | −3.287503E−20 |
| $Y^7$ | 1.208226E−17 | −3.735956E−17 | 5.421342E−17 | −8.994976E−19 | 4.894980E−15 | −1.747517E−20 |
| $X^8$ | −6.860939E−22 | 3.733020E−20 | −1.370615E−17 | −3.978807E−21 | −1.975913E−18 | −3.966972E−22 |
| $X^6Y^2$ | −2.665919E−20 | −1.577571E−19 | 1.832427E−17 | −2.552872E−21 | −2.066761E−17 | −1.153602E−21 |
| $X^4Y^4$ | −1.606232E−19 | 9.112068E−19 | 3.422045E−18 | −4.011070E−20 | −4.034354E−17 | −9.786532E−22 |
| $X^2Y^6$ | −7.104780E−20 | 4.547933E−18 | 3.897160E−19 | 8.558317E−21 | 3.324806E−17 | −2.054121E−22 |
| $Y^8$ | −2.837115E−20 | 3.557864E−20 | −5.077104E−20 | 8.825661E−22 | 3.460507E−17 | 4.049399E−23 |
| $X^8Y$ | 1.837688E−23 | 1.087991E−21 | −7.892883E−20 | −4.154231E−23 | 3.418177E−20 | 2.593417E−25 |
| $X^6Y^3$ | 1.326930E−22 | 6.381757E−21 | 8.816591E−20 | −7.838712E−23 | −1.567137E−20 | 3.310704E−25 |
| $X^4Y^5$ | 5.956987E−22 | 3.566833E−22 | 3.431915E−21 | −1.727422E−22 | −2.315754E−19 | 1.062541E−25 |
| $X^2Y^7$ | 4.749865E−22 | −1.305899E−20 | −1.115108E−21 | 2.927898E−23 | 0.000000E+00 | 5.083980E−27 |
| $Y^9$ | 2.880675E−23 | 3.134161E−21 | 4.687247E−23 | −2.354646E−24 | 0.000000E+00 | −4.697062E−26 |
| $X^{10}$ | 3.263322E−27 | −1.350621E−25 | 7.223418E−23 | 3.596439E−27 | 0.000000E+00 | −1.214434E−27 |
| $X^8Y^2$ | −7.476461E−26 | −8.102951E−24 | −1.439645E−22 | −6.842489E−26 | 0.000000E+00 | −7.139344E−27 |
| $X^6Y^4$ | −2.162180E−25 | −1.982986E−23 | 1.317953E−22 | −1.079450E−25 | 0.000000E+00 | −8.881170E−27 |
| $X^4Y^6$ | −8.415305E−25 | −1.821358E−26 | −5.971700E−24 | −1.561940E−25 | 0.000000E+00 | −3.378805E−27 |
| $X^2Y^8$ | −8.228853E−25 | 3.745838E−24 | −3.016526E−24 | 3.289669E−26 | 0.000000E+00 | 1.400401E−27 |
| $Y^{10}$ | 2.644302E−26 | −1.118733E−23 | 5.389015E−25 | −3.012754E−27 | 0.000000E+00 | 9.011434E−28 |
| Nradius | 1.00E+00 | 1.00E+00 | 1.00E+00 | 1.00E+00 | 1.00E+00 | 1.00E+00 |
| Y-decenter | −100.000 | −84.186 | 100.000 | 19.008 | 11.570 | 24.216 |
| X-rotation | −7.020 | −1.728 | −11.272 | −5.323 | −2.295 | −1.825 |

For the mirrors in projection objective 1000, the maximum deviation of the rotationally-asymmetric surfaces from a corresponding spherical rotationally-symmetric reference surface for each mirror is as follows: 154 μm for mirror 310; 43 μm for mirror 320, 240 μm for mirror 330; 1,110 μm for mirror 340; 440 μm for mirror 350; and 712 μm for mirror 360. The maximum deviation of the rotationally-asymmetric surfaces from a corresponding aspherical rotationally-symmetric reference surface is 47 μm for mirror 310; 33 μm for mirror 320, 96 μm for mirror 330; 35 μm for mirror 340; 152 μm for mirror 350; and 180 μm for mirror 360.

The first and second mean curvature for mirror 310 are $9.51 \times 10^{-4}$ and $9.30 \times 10^{-4}$ respectively. Respective first and second mean curvatures for the other mirrors in the projection objective 1000 are as follows: $2.76 \times 10^{-5}$ and $1.56 \times 10^{-5}$ for mirror 1320; $-2.38 \times 10^{-3}$ and $-2.17 \times 10^{-3}$ for mirror 1330; $1.79 \times 10^{-3}$ and $1.75 \times 10^{-3}$ for mirror 1340; $-2.64 \times 10^{-3}$ and $-2.10 \times 10^{-3}$ for mirror 1350; and $1.93 \times 10^{-3}$ and $1.91 \times 10^{-3}$ for mirror 1360. The sum of the first mean curvature for projection objective 1000 is $-3.19 \times 10^{-4}$. The sum of the second mean curvature is $3.29 \times 10^{-4}$. The sum of the first and second mean curvatures is $9.97 \times 10^{-6}$ and the inverse sum of the first and second mean curvatures is $1.00 \times 10^{-5}$.

The projection objective 1000 images radiation from object plane 1103 to an intermediate image at a location 1305 near mirror 1360. Embodiments that have one or more intermediate images, also include two or more pupil planes. In some embodiments, at least one of these pupil planes is physically accessible for the purposes of placing an aperture stop substantially at that pupil plane. An aperture stop is used to define the size of the projection objective's aperture.

Figure 29:
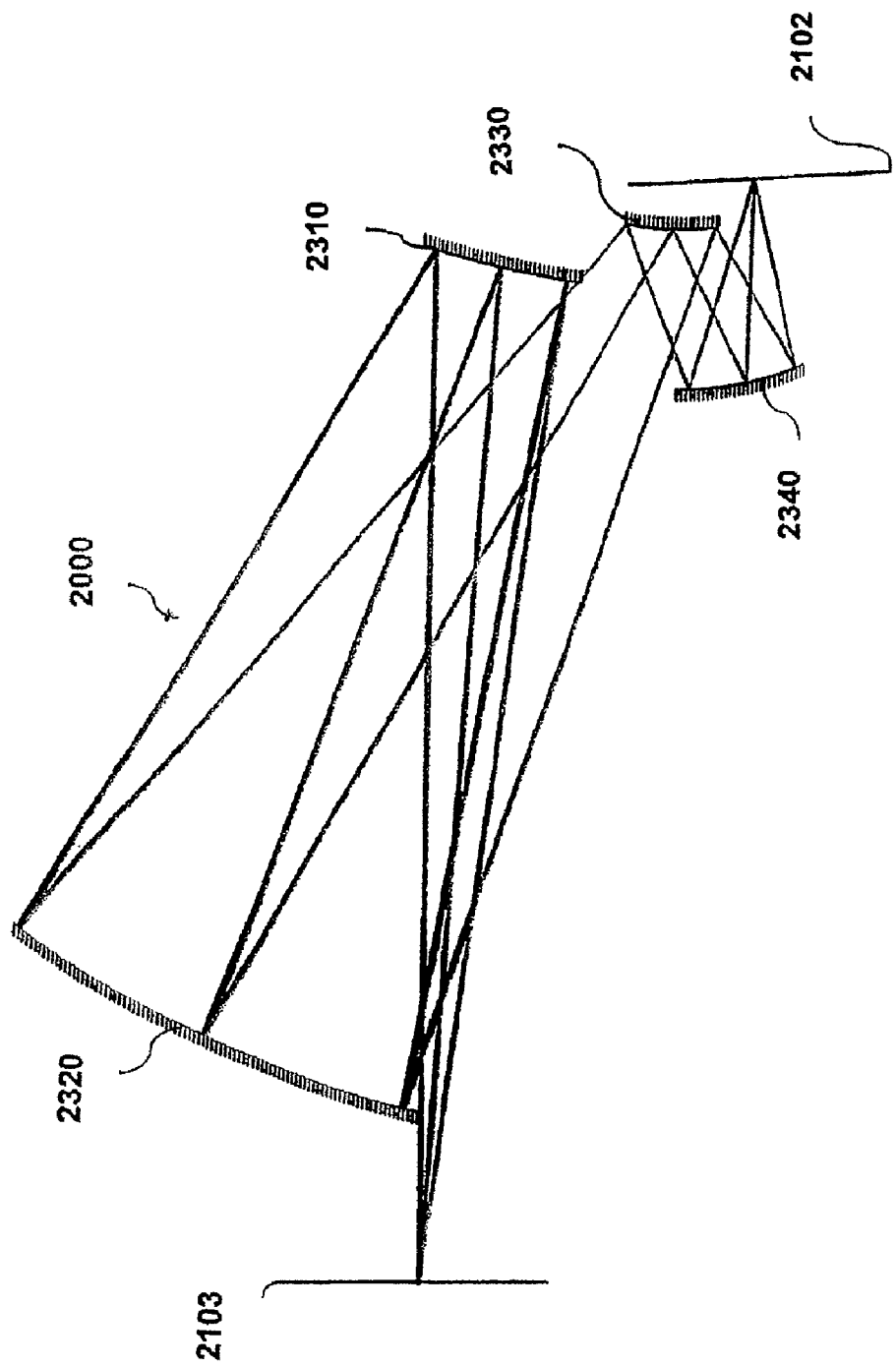
FIG. 29 shows a second embodiment of a projection objective including at least one optical element in form of an asphere according to the invention.

FIG. 29 shows a second exemplary embodiment of a projection objective 2000 for an projection exposure tool operating with EUV-radiation. The projection objective 2000 includes four rotationally-asymmetric mirrors 2310, 2320, 1230, and 2340, which direct radiation from an object plane 2103 to an image plane 2102. An asphere of the above described type according to the invention is used as at least one of these mirrors, which is manufactured, e.g. using the manufacturing method according to the invention. The projection objective 2000 images radiation from an object plane 2103 to an image plane 2102 with a demagnification ratio of 4×.

The projection objective 2000 has an image-side NA of 0.26 and has a rectangular field. The height and width of the field at object plane 2102 is 8 mm and 100 mm, respectively. The tracklength of the projection objective 2000 is 2,360 mm. The image plane 2102 is tilted with respect to object plane 2103 by −3.84°.

Data for projection objective 2000 is presented in Tables 2A, 2B, 2C, and 2D below. Table 2A presents optical data, Tables 2B and 2C present rotationally-asymmetric constants for each of the mirror surfaces. For the purposes of Tables 2A-2D, the mirror designations correlate as follows: mirror 1 (M1) corresponds to mirror 2310; mirror 2 (M2) corresponds to mirror 2320; mirror 3 (M3) corresponds to mirror 2330; and mirror 4 (M4) corresponds to mirror 2340.

TABLE 2A

| Surface | Radius | Spacing | Mode |
|---|---|---|---|
| Object | INFINITY | 2102.043 | |
| Mirror 1 | 3004.821 | −1812.311 | REFL |
| Mirror 2 | 2545.365 | 1957.316 | REFL |
| Mirror 3 | 706.710 | 0.000 | REFL |
| STOP | INFINITY | −339.990 | |
| Mirror 4 | 741.656 | 453.302 | REFL |
| Image | INFINITY | 0.000 | |

TABLE 2B

| Coefficient | M1 | M2 | M3 | M4 | Image |
|---|---|---|---|---|---|
| Y-decenter | −65.523 | 54.692 | 48.905 | 47.778 | 23.755 |
| X-rotation | −2.620 | −2.374 | −2.706 | −1.585 | −3.084 |

With respect to Table 2D, $x_{Object/mm}$ and $y_{Object/mm}$ denote the x- and y-coordinates in the object plane. The values Distortion(x)/nm and Distortion(y)/nm denote the distortion at the respective coordinate. Absolute Value of Distortion/nm denotes the absolute distortion value at the respective coordinate. Telecentricity/Degrees denotes the chief ray angle at the respective coordinate. Wavefront Error at 13.5 nm denotes the RMS wavefront error in units of the illumination wavelength $\lambda=13.5$ nm. As the optical system is mirror symmetric with respect to the yz-plane it is sufficient to give data for fieldpoints having positive x-coordinates in the object plane.

TABLE 2C

| Coefficient | M1 | M2 | M3 | M4 |
|---|---|---|---|---|
| K | −1.09E+00 | 5.80E+02 | 2.06E+00 | 6.72E−01 |
| Y | 0.00E+00 | 0.00E+00 | 0.00E+00 | 0.00E+00 |
| $X^2$ | 3.54E−04 | 9.93E−06 | −5.35E−04 | 1.23E−04 |
| $Y^2$ | 1.97E−04 | 1.07E−05 | 1.23E−05 | 2.97E−04 |
| $X^7Y$ | −6.42E−07 | −2.47E−08 | −4.37E−07 | −2.44E−07 |
| $Y^3$ | 3.69E−07 | 1.89E−08 | −1.34E−06 | −4.72E−07 |
| $X^4$ | 2.63E−09 | 3.01E−12 | −2.94E−08 | −5.08E−09 |
| $X^2Y^2$ | −1.09E−10 | 2.13E−11 | −3.33E−08 | −5.07E−09 |
| $Y^4$ | −6.07E−11 | −1.88E−11 | −1.42E−08 | −1.36E−09 |
| $X^4Y$ | −2.66E−11 | −7.36E−14 | 4.84E−11 | −4.80E−12 |

TABLE 2C-continued

| Coefficient | M1 | M2 | M3 | M4 |
|---|---|---|---|---|
| $X^2Y^3$ | 2.61E−11 | 3.55E−14 | −5.06E−11 | −1.05E−11 |
| $Y^5$ | −1.67E−12 | −6.53E−15 | 7.86E−11 | −1.06E−11 |
| $X^6$ | −8.14E−13 | −2.93E−16 | −7.71E−13 | −1.04E−13 |
| $X^4Y^2$ | 1.29E−13 | 6.33E−17 | −1.53E−12 | −4.13E−13 |
| $X^2Y^4$ | −4.50E−14 | −7.40E−17 | 2.40E−13 | −3.31E−13 |
| $Y^6$ | 1.04E−15 | 1.42E−17 | −6.88E−13 | 1.99E−14 |
| $X^6Y$ | 1.96E−14 | 3.20E−18 | −6.34E−15 | −1.31E−15 |
| $X^4Y^3$ | −2.85E−16 | 2.38E−19 | −1.30E−14 | −5.72E−15 |
| $X^2Y^5$ | −1.60E−16 | −4.36E−20 | 1.43E−14 | −9.75E−16 |
| $Y^7$ | 1.93E−18 | 1.20E−20 | 1.61E−15 | 2.08E−15 |
| $X^8$ | −1.62E−17 | −1.41E−21 | −8.44E−19 | −7.70E−18 |
| $X^6Y^2$ | −1.69E−16 | −1.19E−20 | 1.72E−16 | −1.13E−16 |
| $X^4Y^4$ | 3.10E−18 | 5.44E−22 | 2.91E−16 | −1.26E−16 |
| $X^2Y^6$ | −2.80E−19 | 8.10E−22 | 9.83E−18 | 4.36E−17 |
| $Y^8$ | 8.73E−21 | −4.31E−24 | 4.37E−17 | 3.31E−17 |
| $X^8Y$ | 1.79E−19 | 6.79E−24 | 1.76E−18 | −4.84E−19 |
| $X^6Y^3$ | 6.22E−19 | 1.62E−23 | 6.22E−18 | −2.33E−18 |
| $X^4Y^5$ | −2.21E−20 | −3.41E−24 | −1.22E−19 | −1.19E−18 |
| $X^2Y^7$ | 4.10E−21 | −2.28E−24 | −2.47E−18 | 5.49E−19 |
| $Y^9$ | 9.75E−23 | −5.21E−26 | −5.68E−19 | 2.75E−19 |
| $X^{10}$ | −3.29E−23 | −8.73E−28 | −5.00E−21 | −4.71E−22 |
| $X^8Y^2$ | −4.75E−22 | −7.40E−27 | −6.76E−20 | −6.64E−21 |
| $X^6Y^4$ | −8.19E−22 | −6.01E−27 | −1.52E−19 | −1.46E−20 |
| $X^4Y^6$ | 4.25E−23 | 3.34E−27 | −4.79E−20 | −4.03E−21 |
| $X^2Y^8$ | −6.29E−24 | 2.20E−27 | 5.65E−21 | 1.87E−21 |
| $Y^{10}$ | −3.17E−25 | 9.18E−29 | 2.89E−21 | 8.49E−22 |
| Nradius | 3.00E+00 | 3.00E+00 | 3.00E+00 | 3.00E+00 |

TABLE 2D

| $x_{Object/mm}$ | $y_{Object/mm}$ | Distortion (x)/nm | Distortion (y)/nm | Absolute Value of Distortion/nm | Telecentricity/ Degrees | Wavefront Error at 13.5 nm |
|---|---|---|---|---|---|---|
| 0 | 600 | 0 | −0.960073 | 0.960073 | 0.0196465 | 0.027195 |
| 0 | 602 | 0 | −1.46082 | 1.46082 | 0.0111602 | 0.019766 |
| 0 | 604 | 0 | −1.14157 | 1.14157 | 0.00258716 | 0.015522 |
| 0 | 606 | 0 | −0.708422 | 0.708422 | 0.00607316 | 0.01395 |
| 0 | 608 | 0 | −0.868087 | 0.868087 | 0.0148213 | 0.032279 |
| 12.5 | 600 | −0.702813 | −0.349919 | 0.785105 | 0.0226563 | 0.026075 |
| 12.5 | 602 | −0.506161 | −0.815296 | 0.959639 | 0.0159931 | 0.018251 |
| 12.5 | 604 | −0.214821 | −0.491402 | 0.536306 | 0.011916 | 0.01476 |
| 12.5 | 606 | 0.161171 | −0.084304 | 0.181888 | 0.0132822 | 0.014764 |
| 12.5 | 608 | 0.611783 | −0.300692 | 0.681685 | 0.0190686 | 0.032953 |
| 25 | 600 | −0.828473 | 0.99838 | 1.29736 | 0.0299227 | 0.025603 |
| 25 | 602 | −0.613329 | 0.633853 | 0.882011 | 0.0254871 | 0.014924 |
| 25 | 604 | −0.210678 | 0.966257 | 0.988958 | 0.0234105 | 0.012561 |
| 25 | 606 | 0.359349 | 1.28961 | 1.33874 | 0.0243974 | 0.016745 |
| 25 | 608 | 1.07663 | 0.89729 | 1.40152 | 0.028208 | 0.035061 |
| 37.5 | 600 | −0.079109 | 1.6231 | 1.62502 | 0.0391462 | 0.033551 |
| 37.5 | 602 | −0.207297 | 1.40928 | 1.42444 | 0.036144 | 0.015412 |
| 37.5 | 604 | −0.058849 | 1.73794 | 1.73893 | 0.035006 | 0.008795 |
| 37.5 | 606 | 0.335888 | 1.90321 | 1.93262 | 0.0359723 | 0.018708 |
| 37.5 | 608 | 0.946577 | 1.1986 | 1.5273 | 0.0389452 | 0.038658 |
| 50 | 600 | 1.28921 | −0.96207 | 1.60861 | 0.0492443 | 0.056489 |
| 50 | 602 | 0.261464 | −1.00092 | 1.03450 | 0.0471902 | 0.03219 |
| 50 | 604 | −0.405953 | −0.714664 | 0.821914 | 0.0466375 | 0.018965 |
| 50 | 606 | −0.753775 | −0.809016 | 1.10575 | 0.0476858 | 0.02652 |
| 50 | 608 | −0.82272 | −1.99027 | 2.15361 | 0.0502807 | 0.047096 |

Further details regarding the projection objectives shown in FIGS. 28 and 29 can be taken from US 2007/0058269 A1, the entire content of which is hereby incorporated by reference. The optical element according to this invention can also be included in further embodiments of projection objectives described in this reference.

While the invention has been described with respect to a limited number of embodiments and applications, it will be appreciated that many variations, modifications and other applications of the invention may be made. The applicant seeks, therefore, to cover all such variations, modifications and other applications as fall within the spirit and scope of the invention, as defined by the appended claims, and equivalents thereof.

The invention claimed is:

1. A method of measuring a deviation of an optical surface from a target shape comprising:
generating incoming light having a wave front,
providing at least two diffractive measurement structures, each for adapting part of said wave front to a respective portion of said target shape, and arranging said diffractive measurement structures relative to each other such that each diffractive measurement structure is traversed by a separate subset of rays of said incoming light, wherein each diffractive measurement structure has a respective surface normal and said surface normals are tilted relative to each other,
illuminating said optical surface with said incoming light having traversed said diffractive measurement structures and thereby generating measuring light having interacted with said optical surface, and
performing an interferometric measurement by superimposing reference light with at least a portion of said measuring light.

2. The method according to claim 1,
wherein the tilt between said surface normals of said diffractive measurement structures is at least 1°.

3. The method according to claim 1,
wherein the tilt between said surface normals of said diffractive measurement structures is between 20° and 90°.

4. The method according to claim 1,
wherein said surface normals are tilted such that said diffractive measurement structures form a roof-shaped structure, which is adapted such that said optical surface having a convex shape can be inserted at least partly into the roof-shaped structure.

5. The method according to claim 1,
wherein said incoming light comprises two separate light beams, each of which propagates along a respective surface normal of said diffractive measurement structures.

6. The method according to claim 1,
wherein said diffractive measurement structures are part of respective wave shaping elements and said method further comprises aligning said wave shaping elements by:
providing a first one of said wave shaping elements with a diffractive alignment structure, and
aligning said first wave shaping element and a second one of said wave shaping elements relative to each other by evaluating alignment light having consecutively interacted with said diffractive alignment structure and with said second wave shaping element.

7. The method according to claim 1, further comprising:
illuminating a first area of said optical surface with said incoming light having traversed said diffractive measurement structures and thereby generating first measuring light having interacted with said first area,
generating second measuring light having interacted with at least a second area of said optical surface and determining the wave front of said second measuring light, designated as a second wave front, by performing a second interferometric measurement, and
determining said deviation of said optical surface from said target shape based on said first and said second interferometric measurements.

8. The method according to claim 7,
wherein said first area partially overlaps with said second area.

9. The method according to claim 7,
wherein determining said deviation of said optical surface includes determining respective deviation distributions for said first and said second areas from said first and said second interferometric measurements, respectively, and mathematically stitching said deviation distributions together to obtain an overall deviation distribution.

10. The method according to claim 7,
wherein said target shape of said optical surface is rotationally symmetric with respect to an attributed axis of symmetry, said first interferometric measurement is performed with said optical surface being arranged in a first rotational position and said second interferometric measurement is performed with said optical surface being arranged in a second rotational position different from said first rotational position.

11. The method according to claim 7,
wherein said first interferometric measurement is performed using a first set of diffractive measurement structures and said second interferometric measurement is performed using a second set of diffractive measurement structures, which second set of diffractive measurement structures is shifted with respect to said first set of diffractive measurement structures and has correspondingly adapted diffractive measurement structures.

12. The method according to claim 1,
wherein each diffractive measurement structure illuminates a separate area of said optical surface, and said method further comprises:
illuminating a first area of said optical surface with said incoming light having traversed said diffractive measurement structures, thereby generating first measuring light having interacted with said first area,
determining the wave front of said first measuring light, designated as a first wave front, by performing a first interferometric measurement,
generating second measuring light having interacted with at least a second area of said optical surface and determining the wave front of said second measuring light, designated as a second wave front, by performing a second interferometric measurement, and
determining a deviation of said optical surface from said target shape using a stitching algorithm, which stitching algorithm includes determining misalignment components of said at least two diffractive measurement structures based on said first wave front and said second wave front.

13. The method according to claim 12,
wherein said determined misalignment components include alignment offsets of each diffractive measurement structure, which alignment offsets include an offset value for each degree of freedom in alignment of the respective diffractive measurement structure.

14. The method according to claim 12,
wherein said determining of said misalignment components includes determining a sensitivity distribution $(B_{kl})_{x,y}$ for each diffractive measurement structure, which sensitivity distribution $(B_{kl})_{x,y}$ describes the influence of a given misalignment of a respective diffractive measurement structure k in a respective degree of freedom l on said first wave front as a function of coordinates x and y in a projection plane perpendicular to a propagation direction of said first measuring light, and minimizing a mathematical term including the following expression:

$$\sum_{l=1}^{Af} b_{kl} \cdot (B_{kl})_{x,y}, \qquad (1)$$

wherein $b_{kl}$ is a respective misalignment coefficient of a respective diffractive measurement structure k and a respective degree of freedom l, and Af is the number of degrees of freedom in alignment of said diffractive measurement structures.

15. The method according to claim 12,
wherein said determining of said misalignment components includes determining a sensitivity distribution $A_{jx,y}$ of said optical surface describing the influence of a given misalignment of said optical surface in a respective degree of freedom j on said first wave front as a function of coordinates x and y, and minimizing a mathematical term including the following expression:

$$\sum_{j=1}^{AJ} [a_{mj} - a_{nj}] \cdot A_{jx,y}, \qquad (2)$$

wherein $a_{mj}$ and $a_{nj}$ are respective misalignment coefficients of said optical surface for respective rotational positions m and n, and AJ is the number of degrees of freedom in alignment of said optical surface.

16. The method according to claim 12,
wherein, prior to performing said first interferometric measurement, the distance between one of said diffractive measurement structures, serving as reference element, and said optical surface is adjusted or measured.

17. The method according to claim 12,
wherein, prior to performing said first interferometric measurement, said diffractive measurement structures are roughly aligned such that a continuous wave front of said first measuring light can be measured during said first interferometric measurement.

* * * * *

UNITED STATES PATENT AND TRADEMARK OFFICE
CERTIFICATE OF CORRECTION

PATENT NO. : 8,264,695 B2  
APPLICATION NO. : 13/030748  
DATED : September 11, 2012  
INVENTOR(S) : Ralf Arnold et al.

Page 1 of 1

It is certified that error appears in the above-identified patent and that said Letters Patent is hereby corrected as shown below:

On the Title Page, Item [56], Column 2, Other Publications, Line 3: delete "13,," and insert -- 13, --

Title Page 2, Item [56], Column 2, Other Publications, Line 1: delete "asperic" and insert -- aspheric --

Title Page 2, Item [56], Column 2, Other Publications, Line 12: after "computer-generated" delete "generated"

Title Page 2, Item [56], Column 2, Other Publications, Line 22: delete "Optics,," and insert -- Optics, --

Title Page 2, Item [56], Column 2, Other Publications, Line 39: delete "Punlication" and insert -- Publication --

In the Specifications:

Column 6, Line 7: after "grating" insert -- . --

Column 9, Line 8: delete "algorith" and insert -- algorithm --

Column 11, Line 15: delete "decentring" and insert -- decentering --

Column 11, Line 24: delete "$A_{jk,y}$" and insert -- $A_{jx,y}$ --

Column 12, Line 55: delete "300 nm" and insert -- 300 mm --

Column 12, Line 58: delete "CHG's" and insert -- CGH's --

Column 14, Line 46: delete "ashpere," and insert -- asphere, --

Column 14, Line 53: delete "ashpere," and insert -- asphere, --

Column 25, Line 13: after "of" delete "such"

Column 25-26, Line 14, in Table 1B col. M5: delete "-7.841517E-34" and insert -- -7.841517E-14 --

Column 29, Line 23, in Table 2C: delete "$X^7Y$" and insert -- $X^2Y$ --

Signed and Sealed this  
Eleventh Day of June, 2013

Teresa Stanek Rea  
*Acting Director of the United States Patent and Trademark Office*